(12) United States Patent
Nishida

(10) Patent No.: US 9,519,371 B2
(45) Date of Patent: Dec. 13, 2016

(54) DISPLAY DEVICE AND CONTROL METHOD THEREFOR

(71) Applicant: CANON KABUSHIKI KAISHA, Tokyo (JP)

(72) Inventor: Ryuji Nishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/928,548

(22) Filed: Jun. 27, 2013

(65) Prior Publication Data
US 2014/0009415 A1 Jan. 9, 2014

(30) Foreign Application Priority Data

Jul. 4, 2012 (JP) ................................. 2012-150514
Apr. 23, 2013 (JP) ................................. 2013-090165

(51) Int. Cl.
G06F 3/041 (2006.01)
G06F 3/0488 (2013.01)
G06F 3/01 (2006.01)
G06F 3/0481 (2013.01)

(52) U.S. Cl.
CPC ............ *G06F 3/0416* (2013.01); *G06F 3/018* (2013.01); *G06F 3/0488* (2013.01); *G06F 3/04815* (2013.01); *G06F 3/04886* (2013.01)

(58) Field of Classification Search
CPC ................................. G06F 3/041–3/047; G06F 2203/04101–2230/04113; G06F 3/04845; G06F 4/04808; G06F 4/04804; G06F 2003/04808

USPC ......... 345/173–178; 178/18.01–18.09, 18.11
See application file for complete search history.

(56) References Cited

U.S. PATENT DOCUMENTS

| | | |
|---|---|---|
| 2007/0291015 A1 | 12/2007 | Mori |
| 2010/0188353 A1* | 7/2010 | Yoon et al. .................... 345/173 |
| 2010/0277420 A1* | 11/2010 | Charlier et al. ............... 345/173 |
| 2012/0169670 A1* | 7/2012 | Kim ........................ G06F 3/017 345/175 |
| 2013/0141373 A1* | 6/2013 | Takuma et al. ................ 345/173 |

FOREIGN PATENT DOCUMENTS

| | | |
|---|---|---|
| JP | 2003-209719 A | 7/2003 |
| JP | 2007-334827 A | 12/2007 |
| JP | 2008-083510 A | 4/2008 |

* cited by examiner

*Primary Examiner* — Stephen Sherman
(74) *Attorney, Agent, or Firm* — Fitzpatrick, Cella, Harper & Scinto

(57) ABSTRACT

In a display device which has a transparent display with touch operations being carried out from opposite sides thereof, i.e., a front face and aback face, operability of the touch operations can be improved. In display control of graphics data which is constructed to include a first component which assumes a touch operation from either one of the front face and the back face, and a second component which assumes a touch operation from a side opposite to the side from which the touch operation is assumed by the first component, only the first component is first displayed, and after a touch operation with respect to the first component is carried out, a content of the second component is decided according to an instruction inputted by the touch operation, so that the second component is then displayed.

12 Claims, 36 Drawing Sheets

| CLASSIFICATION OF OPERATIONS | OPERATION DIRECTION OPERATION AXIS | DETAILS OF OPERATION CONTENT | FRONT FACE TOUCH | | BACK FACE TOUCH OPERATION | | |
|---|---|---|---|---|---|---|---|
| | | | FINGER | SLIDING DIRECTION OF TOUCH OPERATION | FINGER | SLIDING DIRECTION OF TOUCH OPERATION | POSITIONAL RELATION WITH THUMB |
| ROTATION | AROUND X AXIS | ROTATION IN α DIRECTION | THUMB | DOWN | INDEX FINGER | UP | SAME REGION |
| | | ROTATION IN DIRECTION OPPOSITE TO α | THUMB | UP | INDEX FINGER | DOWN | SAME REGION |
| | AROUND Y AXIS | ROTATION IN β DIRECTION | THUMB | RIGHT | INDEX FINGER | LEFT | SAME REGION |
| | | ROTATION IN DIRECTION OPPOSITE TO β | THUMB | LEFT | INDEX FINGER | RIGHT | SAME REGION |
| | AROUND Z AXIS | ROTATION IN γ DIRECTION | THUMB | COUNTERCLOCKWISE | INDEX FINGER | COUNTERCLOCKWISE | AWAY REGION |
| | | ROTATION IN DIRECTION OPPOSITE TO γ | THUMB | CLOCKWISE | INDEX FINGER | CLOCKWISE | AWAY REGION |
| MOVEMENT | IN X DIRECTION | MOVEMENT TOWARD + SIDE IN X DIRECTION | THUMB | RIGHT | NONE | — | — |
| | | | NONE | — | INDEX FINGER | RIGHT | — |
| | | MOVEMENT TOWARD − SIDE IN X DIRECTION | THUMB | LEFT | NONE | — | — |
| | | | NONE | — | INDEX FINGER | LEFT | — |
| | IN Y DIRECTION | MOVEMENT TOWARD + SIDE IN Y DIRECTION | THUMB | UP | NONE | — | — |
| | | | NONE | — | INDEX FINGER | UP | — |
| | | MOVEMENT TOWARD − SIDE IN Y DIRECTION | THUMB | DOWN | NONE | — | — |
| | | | NONE | — | INDEX FINGER | DOWN | — |
| | IN Z DIRECTION | MOVEMENT TOWARD + SIDE IN Z DIRECTION (ENLARGEMENT) | NONE | — | INDEX FINGER | TWO CONSECUTIVE TOUCHES | — |
| | | | THUMB | FIXED WHILE TOUCHING | INDEX & MIDDLE FINGERS | UP WITH TWO FINGERS TOGETHER | SAME REGION |
| | | MOVEMENT TOWARD − SIDE IN Z DIRECTION (REDUCTION) | THUMB | TWO CONSECUTIVE TOUCHES | NONE | — | — |
| | | | THUMB | FIXED WHILE TOUCHING | INDEX & MIDDLE FINGERS | DOWN WITH TWO FINGERS TOGETHER | SAME REGION |

Fig.10A

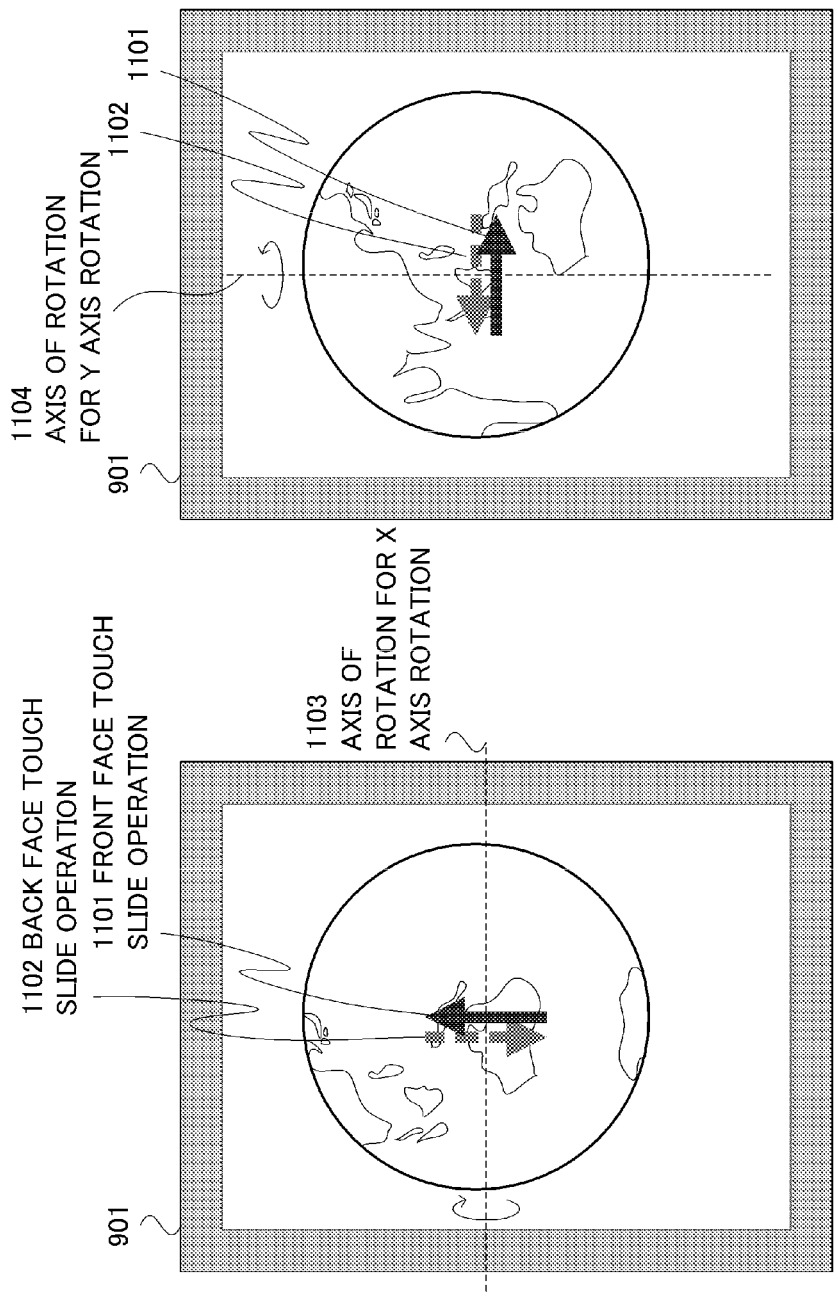

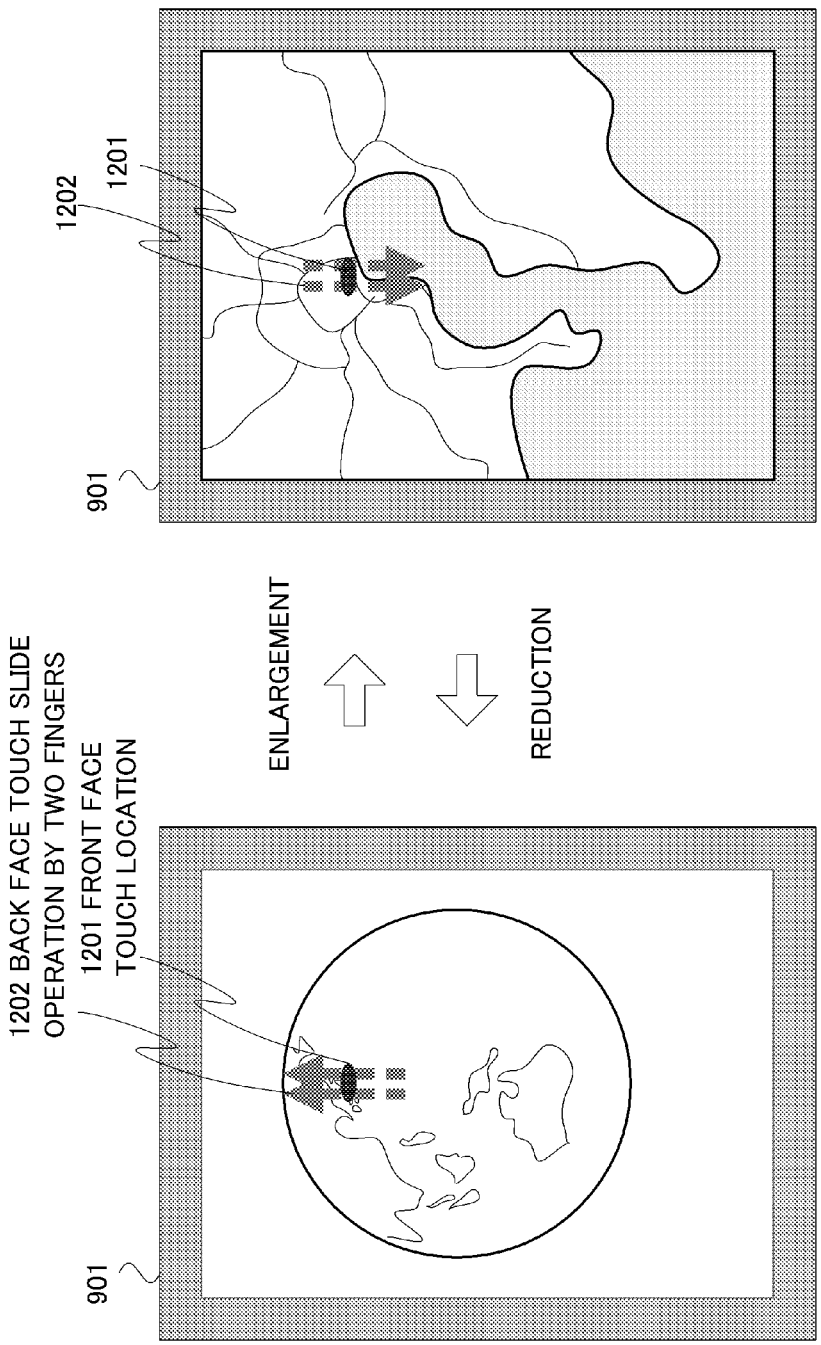

| FRONT FACE TOUCH OPERATION | | BACK FACE TOUCH OPERATION | | ROTATION/ TRANSITION SPEED |
|---|---|---|---|---|
| FINGER | SLIDING DIRECTION OF TOUCH OPERATION | FINGER | SLIDING DIRECTION OF TOUCH OPERATION | |
| THUMB | FIXED WHILE TOUCHING | INDEX FINGER | UP AND DOWN & LEFT AND RIGHT | LOW SPEED |
| THUMB | UP AND DOWN & LEFT AND RIGHT | INDEX FINGER | FIXED WHILE TOUCHING | LOW SPEED |
| THUMB | UP AND DOWN & LEFT AND RIGHT | INDEX FINGER | DIRECTION OPPOSITE TO THAT ON FRONT FACE | NORMAL |
| THUMB | FIXED WHILE TOUCHING | FOUR FINGERS ON BACK FACE | UP AND DOWN & LEFT AND RIGHT | HIGH SPEED |
| THUMB | UP AND DOWN & LEFT AND RIGHT | FOUR FINGERS ON BACK FACE | DIRECTION OPPOSITE TO THAT ON FRONT FACE | HIGHEST SPEED |

Fig.13

| CLASSIFICATION OF OPERATIONS | OPERATION DIRECTION OPERATION AXIS | FRONT FACE TOUCH OPERATION | | BACK FACE TOUCH OPERATION | | |
|---|---|---|---|---|---|---|
| | | FINGER | SLIDING DIRECTION OF TOUCH OPERATION | FINGER | SLIDING DIRECTION OF TOUCH OPERATION | POSITIONAL RELATION WITH THUMB |
| USER'S VIEW POINT MOVEMENT | UPWARD ROTATION OF USER'S VIEW POINT | THUMB | UP | INDEX FINGER | DOWN | SAME REGION |
| | DOWNWARD ROTATION OF USER'S VIEW POINT | THUMB | DOWN | INDEX FINGER | UP | SAME REGION |
| | LEFTWARD ROTATION OF USER'S VIEW POINT | THUMB | LEFT | INDEX FINGER | RIGHT | SAME REGION |
| | RIGHTWARD ROTATION OF USER'S VIEW POINT | THUMB | RIGHT | INDEX FINGER | LEFT | SAME REGION |
| USER POSITION MOVEMENT | BACKWARD MOVEMENT OF USER POSITION | THUMB NONE | UP — | NONE INDEX FINGER | — UP | — — |
| | FORWARD MOVEMENT OF USER POSITION | THUMB NONE | DOWN — | NONE INDEX FINGER | — DOWN | — — |
| | RIGHTWARD MOVEMENT OF USER POSITION | THUMB NONE | LEFT — | NONE INDEX FINGER | — LEFT | — — |
| | LEFTWARD MOVEMENT OF USER POSITION | THUMB NONE | RIGHT — | NONE INDEX FINGER | — RIGHT | — — |
| ENLARGEMENT/ REDUCTION | ENLARGEMENT | NONE THUMB | — FIXED WHILE TOUCHING | INDEX FINGER INDEX & MIDDLE FINGERS | TWO CONSECUTIVE TOUCHES UP WITH TWO FINGERS TOGETHER | — SAME REGION |
| | REDUCTION | THUMB THUMB | TWO CONSECUTIVE TOUCHES FIXED WHILE TOUCHING | NONE INDEX & MIDDLE FINGERS | — DOWN WITH TWO FINGERS TOGETHER | — SAME REGION |

Fig.15

| CLASSIFICATION OF OPERATIONS | OPERATION DIRECTION OPERATION AXIS | | OPERATION TO OBJECT | FRONT FACE TOUCH OPERATION | | BACK FACE TOUCH OPERATION | | TOUCH LOCATION |
|---|---|---|---|---|---|---|---|---|
| | | | | FINGER | SLIDING DIRECTION OF TOUCH OPERATION | FINGER | SLIDING DIRECTION OF TOUCH OPERATION | |
| OBJECT ROTATION | AROUND X AXIS | | ROTATION IN α DIRECTION | THUMB | DOWN | INDEX FINGER | UP | ON TARGET OBJECT |
| | | | ROTATION IN DIRECTION OPPOSITE TO α | THUMB | UP | INDEX FINGER | DOWN | ON TARGET OBJECT |
| | AROUND Y AXIS | | ROTATION IN β DIRECTION | THUMB | RIGHT | INDEX FINGER | LEFT | ON TARGET OBJECT |
| | | | ROTATION IN DIRECTION OPPOSITE TO β | THUMB | LEFT | INDEX FINGER | RIGHT | ON TARGET OBJECT |
| | AROUND Z AXIS | | ROTATION IN γ DIRECTION | THUMB | FIXED WHILE TOUCHING | INDEX & MIDDLE FINGERS | INDEX FINGER FIXED WHILE TOUCHING & MIDDLE FINGER ROTATING COUNTERCLOCKWISE | THUMB & INDEX FINGERS: ON TARGET OBJECT MIDDLE FINGER: ARBITRARY |
| | | | ROTATION IN DIRECTION OPPOSITE TO γ | THUMB | FIXED WHILE TOUCHING | INDEX & MIDDLE FINGERS | INDEX FINGER FIXED WHILE TOUCHING & MIDDLE FINGER ROTATING CLOCKWISE | THUMB & INDEX FINGER: ON TARGET OBJECT MIDDLE FINGER: ARBITRARY |
| OBJECT MOVEMENT | IN X DIRECTION | | MOVEMENT TOWARD + SIDE IN X DIRECTION | THUMB | RIGHT | INDEX FINGER | RIGHT | ON TARGET OBJECT |
| | | | MOVEMENT TOWARD − SIDE IN X DIRECTION | THUMB | LEFT | INDEX FINGER | LEFT | ON TARGET OBJECT |
| | IN Y DIRECTION | | MOVEMENT TOWARD + SIDE IN Y DIRECTION | THUMB | UP | INDEX FINGER | UP | ON TARGET OBJECT |
| | | | MOVEMENT TOWARD − SIDE IN Y DIRECTION | THUMB | DOWN | INDEX FINGER | DOWN | ON TARGET OBJECT |
| | IN Z DIRECTION | | MOVEMENT TOWARD + SIDE IN Z DIRECTION | THUMB | FIXED WHILE TOUCHING | INDEX & MIDDLE FINGERS | UP WITH TWO FINGERS TOGETHER | THUMB: ON TARGET OBJECT INDEX & MIDDLE FINGERS: ARBITRARY |
| | | | MOVEMENT TOWARD − SIDE IN Z DIRECTION | THUMB | FIXED WHILE TOUCHING | INDEX & MIDDLE FINGERS | DOWN WITH TWO FINGERS TOGETHER | THUMB: ON TARGET OBJECT INDEX & MIDDLE FINGERS: ARBITRARY |

Fig.21

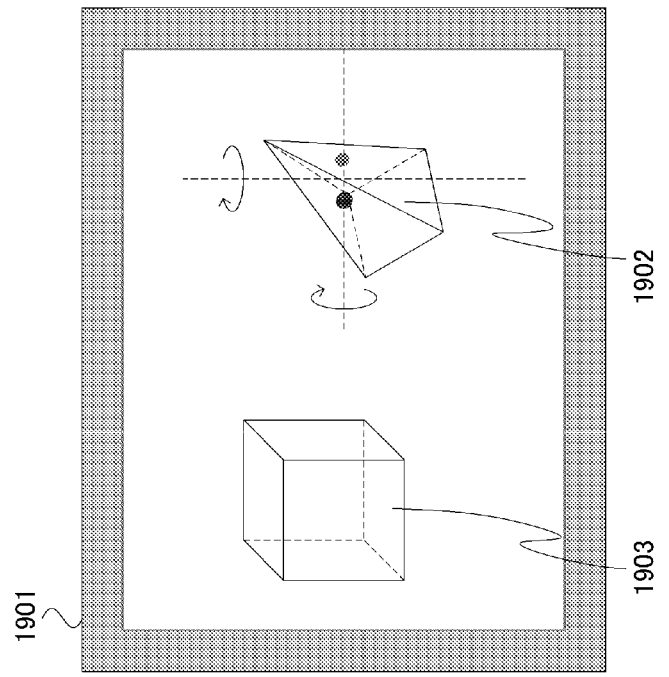
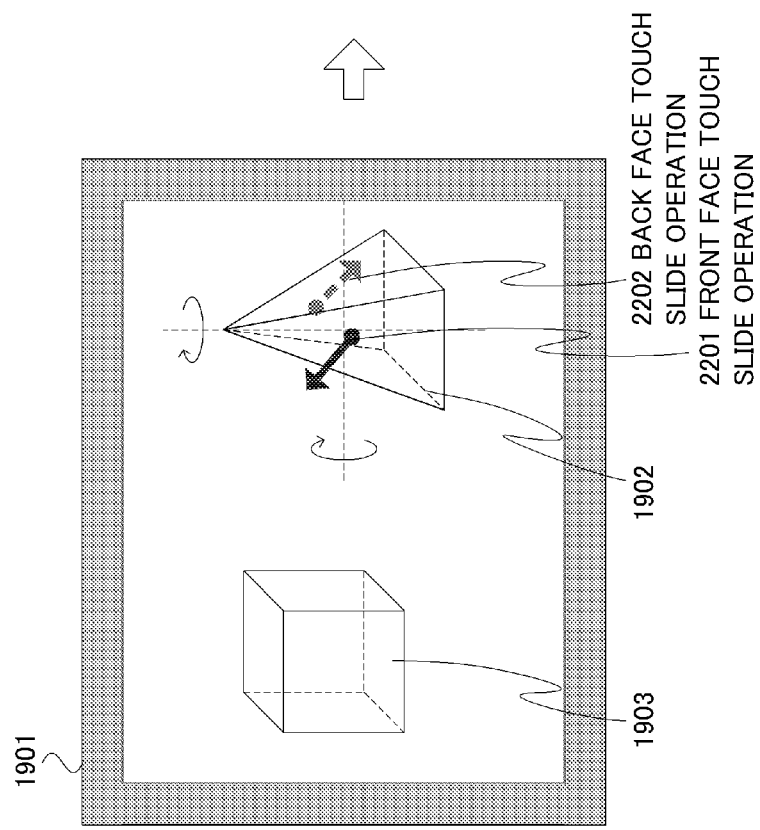

| FRONT FACE | | BACK FACE | |
|---|---|---|---|
| FINGER | SLIDING DIRECTION OF TOUCH OPERATION | FINGER | SLIDING DIRECTION OF TOUCH OPERATION | CENTER OF ROTATION |

| FRONT FACE | | BACK FACE | | |
|---|---|---|---|---|
| FINGER | SLIDING DIRECTION OF TOUCH OPERATION | FINGER | SLIDING DIRECTION OF TOUCH OPERATION | CENTER OF ROTATION |
| THUMB | UP AND DOWN & LEFT AND RIGHT | INDEX FINGER | DIRECTION OPPOSITE TO THAT ON FRONT FACE | BETWEEN TWO FINGERS |
| THUMB | UP AND DOWN & LEFT AND RIGHT | INDEX FINGER | FIXED WHILE TOUCHING | TOUCH LOCATION OF INDEX FINGER |
| THUMB | FIXED WHILE TOUCHING | INDEX FINGER | UP AND DOWN & LEFT AND RIGHT | TOUCH LOCATION OF THUMB |

*Fig.22C*

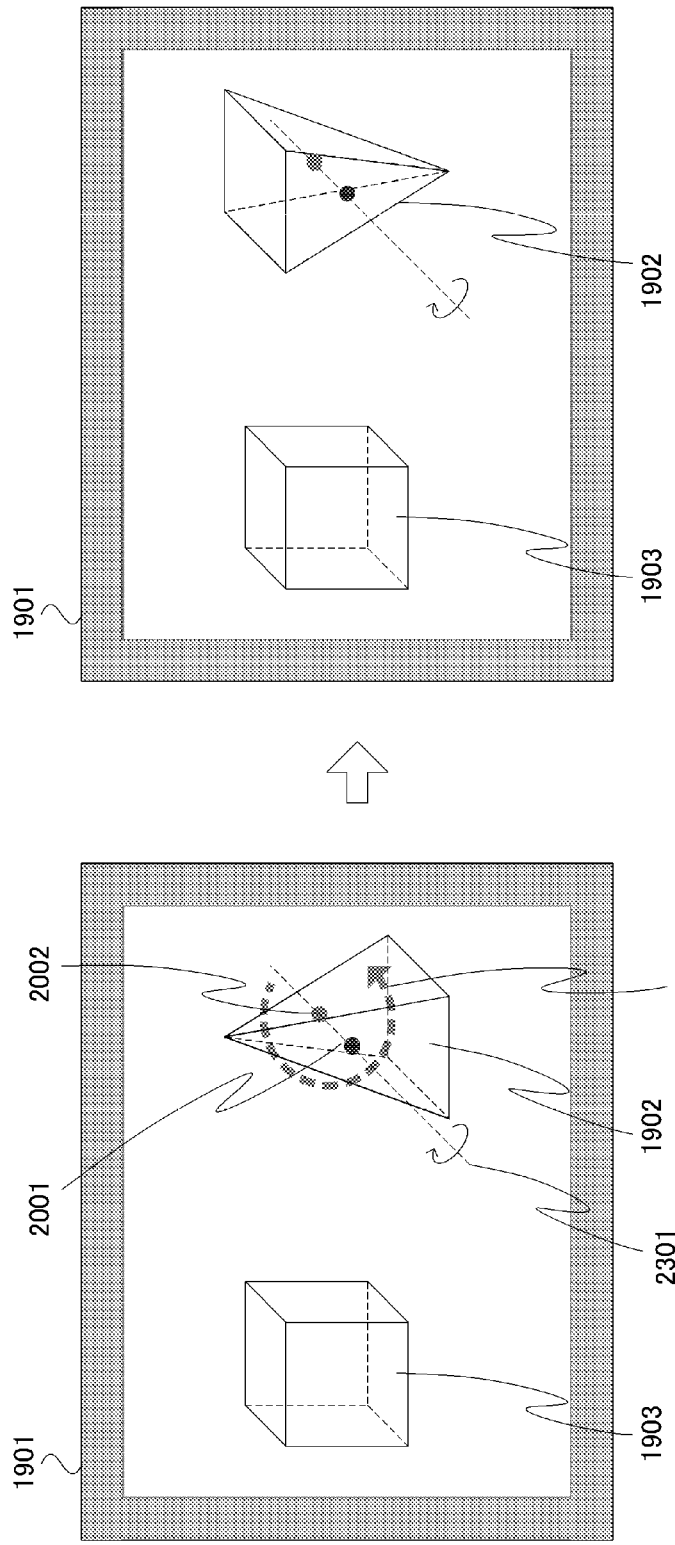

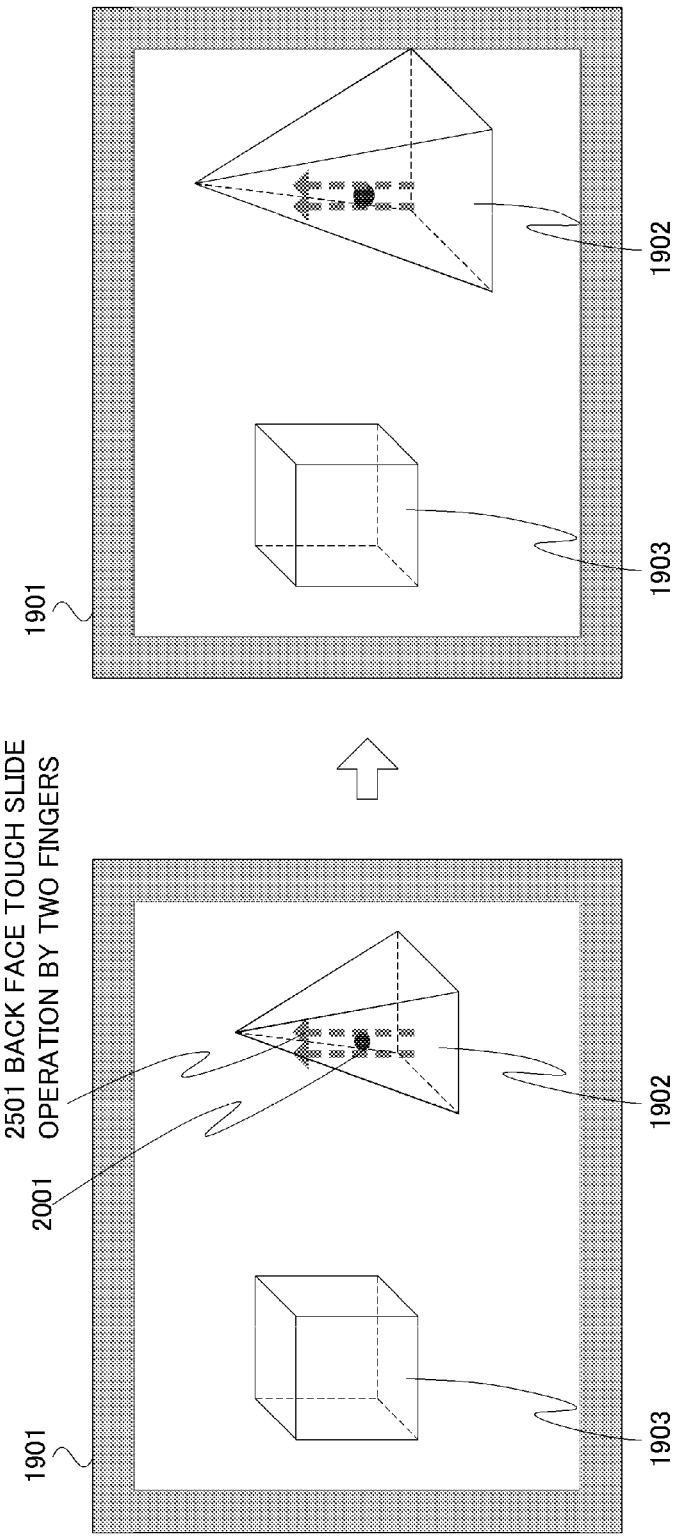

| CLASSIFICATION OF OPERATIONS | OPERATION DIRECTION | OPERATION TO SCREEN DISPLAY | FRONT FACE TOUCH OPERATION | | BACK FACE TOUCH OPERATION | | TOUCH LOCATION |
|---|---|---|---|---|---|---|---|
| | OPERATION AXIS | | FINGER | SLIDING DIRECTION OF TOUCH OPERATION | FINGER | SLIDING DIRECTION OF TOUCH OPERATION | |
| SCREEN ROTATION | AROUND X AXIS | ROTATION IN α DIRECTION | THUMB | DOWN | INDEX FINGER | UP | LOCATION OTHER THAN OBJECTS |
| | | ROTATION IN DIRECTION OPPOSITE TO α | THUMB | UP | INDEX FINGER | DOWN | LOCATION OTHER THAN OBJECTS |
| | AROUND Y AXIS | ROTATION IN β DIRECTION | THUMB | RIGHT | INDEX FINGER | LEFT | LOCATION OTHER THAN OBJECTS |
| | | ROTATION IN DIRECTION OPPOSITE TO β | THUMB | LEFT | INDEX FINGER | RIGHT | LOCATION OTHER THAN OBJECTS |
| | AROUND Z AXIS | ROTATION IN γ DIRECTION | THUMB | FIXED WHILE TOUCHING | INDEX & MIDDLE FINGERS | INDEX FINGER FIXED WHILE TOUCHING & MIDDLE FINGER ROTATING COUNTERCLOCKWISE | THUMB, INDEX FINGER: LOCATION OTHER THAN OBJECTS MIDDLE FINGER: ARBITRARY |
| | | ROTATION IN DIRECTION OPPOSITE TO γ | THUMB | FIXED WHILE TOUCHING | INDEX & MIDDLE FINGERS | INDEX FINGER FIXED WHILE TOUCHING & MIDDLE FINGER ROTATING CLOCKWISE | THUMB, INDEX FINGER: LOCATION OTHER THAN OBJECTS MIDDLE FINGER: ARBITRARY |
| | ROTATION IN φ DIRECTION | ROTATION TO + SIDE IN φ DIRECTION | THUMB | COUNTERCLOCKWISE IN φ DIRECTION ON SPHERICAL SURFACE | NONE | — | ARBITRARY |
| | | ROTATION TO − SIDE IN φ DIRECTION | NONE | — | INDEX FINGER | COUNTERCLOCKWISE IN φ DIRECTION ON SPHERICAL SURFACE | ARBITRARY |
| | | ROTATION TO + SIDE IN φ DIRECTION | THUMB | CLOCKWISE IN φ DIRECTION ON SPHERICAL SURFACE | NONE | — | ARBITRARY |
| | | ROTATION TO − SIDE IN φ DIRECTION | NONE | — | INDEX FINGER | CLOCKWISE IN φ DIRECTION ON SPHERICAL SURFACE | ARBITRARY |
| | ROTATION IN θ DIRECTION | ROTATION TO + SIDE IN θ DIRECTION | THUMB | COUNTERCLOCKWISE IN θ DIRECTION ON SPHERICAL SURFACE | NONE | — | ARBITRARY |
| | | ROTATION TO − SIDE IN θ DIRECTION | NONE | — | INDEX FINGER | COUNTERCLOCKWISE IN θ DIRECTION ON SPHERICAL SURFACE | ARBITRARY |
| | | ROTATION TO + SIDE IN θ DIRECTION | THUMB | CLOCKWISE IN θ DIRECTION ON SPHERICAL SURFACE | NONE | — | ARBITRARY |
| | | ROTATION TO − SIDE IN θ DIRECTION | NONE | — | INDEX FINGER | CLOCKWISE IN θ DIRECTION ON SPHERICAL SURFACE | ARBITRARY |

*Fig.26A*

| CLASSIFICATION OF OPERATIONS | OPERATION DIRECTION OPERATION AXIS | OPERATION TO SCREEN DISPLAY | FRONT FACE TOUCH OPERATION | | BACK FACE TOUCH OPERATION | | TOUCH LOCATION |
|---|---|---|---|---|---|---|---|
| | | | FINGER | SLIDING DIRECTION OF TOUCH OPERATION | FINGER | SLIDING DIRECTION OF TOUCH OPERATION | |
| SCREEN MOVEMENT | IN X DIRECTION | MOVEMENT TOWARD + SIDE IN X DIRECTION | THUMB | RIGHT | INDEX FINGER | RIGHT | LOCATION OTHER THAN OBJECTS |
| | | | NONE | --- | INDEX & MIDDLE FINGERS | RIGHT WITH TWO FINGERS TOGETHER | ARBITRARY |
| | | MOVEMENT TOWARD – SIDE IN X DIRECTION | THUMB | LEFT | INDEX FINGER | LEFT | LOCATION OTHER THAN OBJECTS |
| | | | NONE | --- | INDEX & MIDDLE FINGERS | LEFT WITH TWO FINGERS TOGETHER | ARBITRARY |
| | IN Y DIRECTION | MOVEMENT TOWARD + SIDE IN Y DIRECTION | THUMB | UP | INDEX FINGER | UP | LOCATION OTHER THAN OBJECTS |
| | | | NONE | --- | INDEX & MIDDLE FINGERS | UP WITH TWO FINGERS TOGETHER | ARBITRARY |
| | | MOVEMENT TOWARD – SIDE IN Y DIRECTION | THUMB | DOWN | INDEX FINGER | DOWN | LOCATION OTHER THAN OBJECTS |
| | | | NONE | --- | INDEX & MIDDLE FINGERS | DOWN WITH TWO FINGERS TOGETHER | ARBITRARY |
| | IN Z DIRECTION | MOVEMENT TOWARD + SIDE IN Z DIRECTION | THUMB | FIXED WHILE TOUCHING | INDEX & MIDDLE FINGERS | UP WITH TWO FINGERS TOGETHER | THUMB: ON TARGET OBJECT INDEX & MIDDLE FINGERS: ARBITRARY |
| | | MOVEMENT TOWARD – SIDE IN Z DIRECTION | THUMB | FIXED WHILE TOUCHING | INDEX & MIDDLE FINGERS | DOWN WITH TWO FINGERS TOGETHER | THUMB: ON TARGET OBJECT INDEX & MIDDLE FINGERS: ARBITRARY |

*Fig.26B*

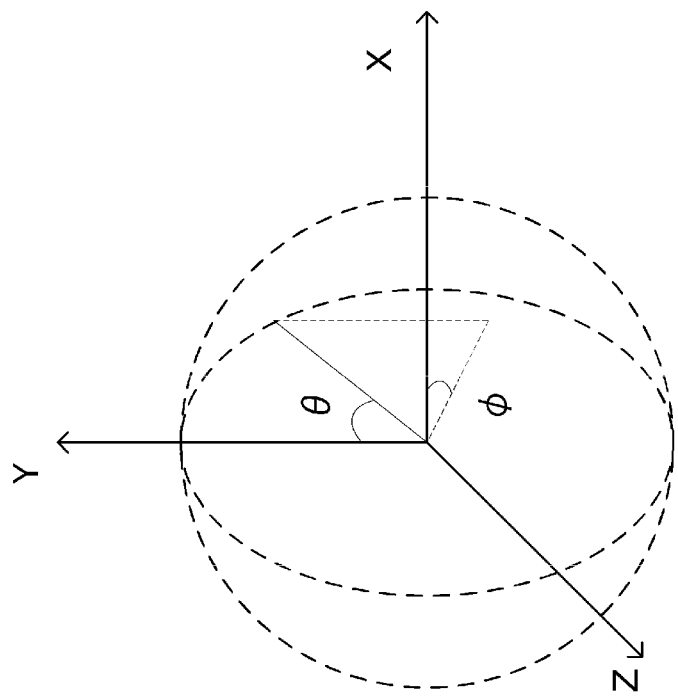
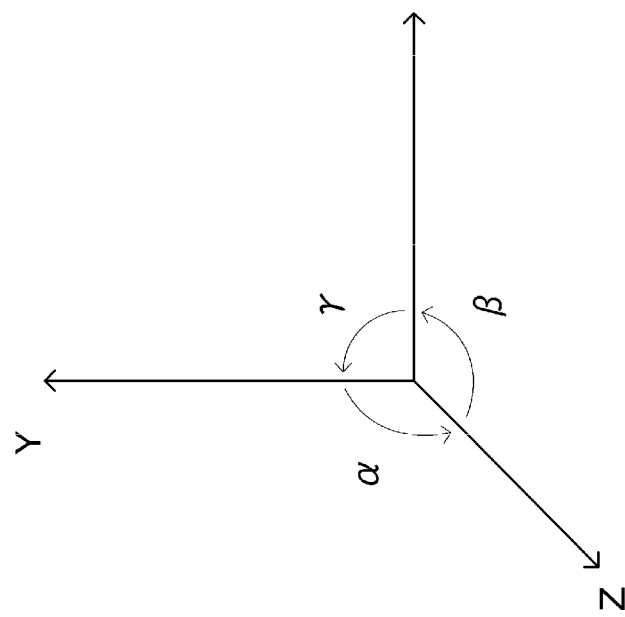
Fig.26C

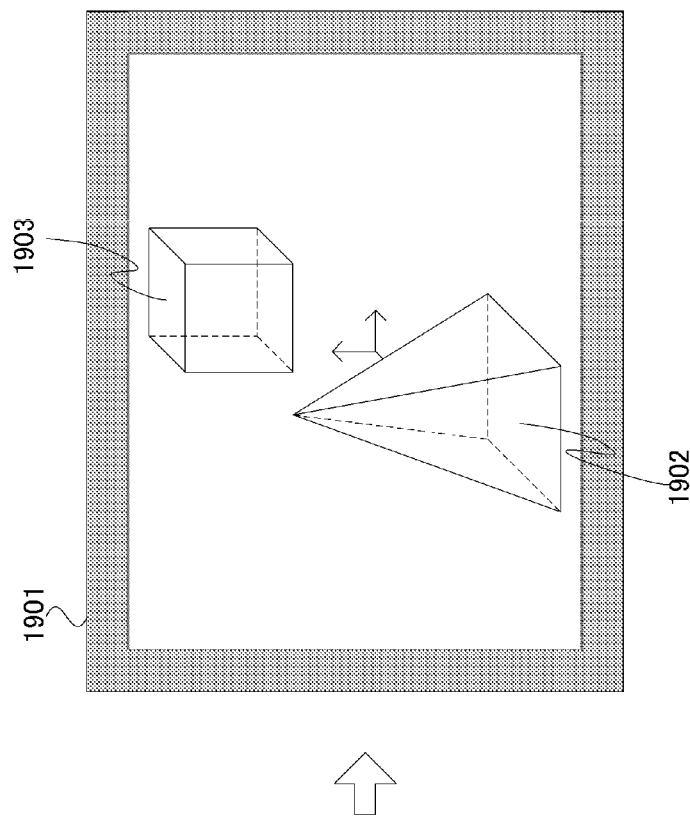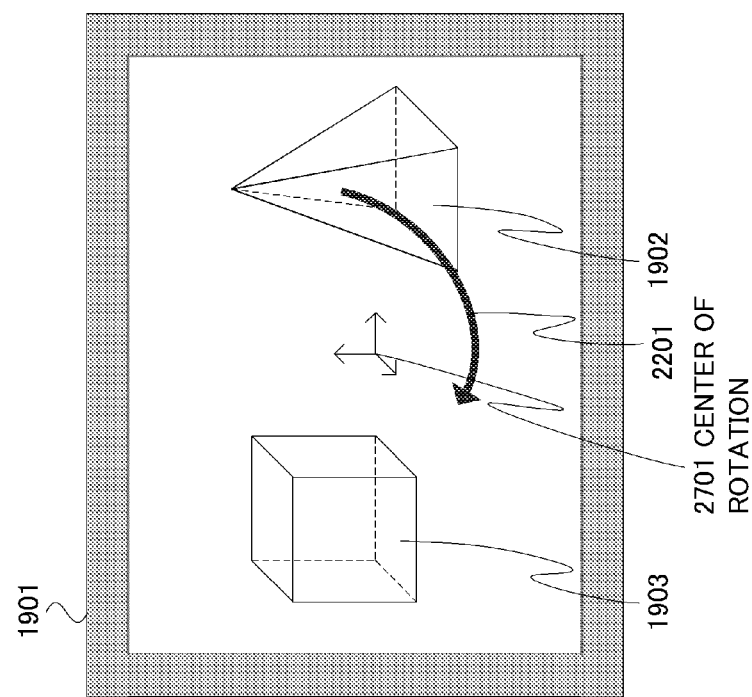
Fig.27B
Fig.27A

DISPLAY DEVICE AND CONTROL METHOD THEREFOR

BACKGROUND OF THE INVENTION

Field of the Invention

The present invention relates to a display device and a control method therefor in which a transparent display is used to which touch operations can be made from opposite sides thereof, i.e., a front face and a back face.

Description of the Related Art

Equipment using a transparent display has been put into practical use. With such equipment, light emitting devices such as organic electroluminescence diodes are formed on a transparent substrate, so that when an image is hidden, the transparent substrate becomes transparent, whereas when an image is displayed, such a display is carried out with the transparent substrate being made translucent. In addition, for the control of transparency, it is proposed that a plurality of liquid crystal shutter layers are superposed or stacked to form a transparent substrate, so that the transparency of the substrate is controlled according to the level or degree of opening and closing of each shutter (refer to Japanese patent application laid-open No. 2008-083510).

On the other hand, touch operation interfaces are becoming popular as user interfaces (UI) for display devices of portable terminals or personal digital assistants. In addition, there has been proposed a method of carrying out a touch operation from a back face of a display device, while looking at a front face thereof.

If a transparent display is used, an operation from a back face side can be seen from a front face side, a touch operation from the back face becomes easy. Thus, it is considered that with a portable terminal or personal digital assistant using a transparent display, a backside touch operation will become popular (refer to Japanese patent application laid-open No. 2007-334827).

Moreover, there has also been disclosed a technique in which in cases where a certain icon is pushed down, another icon associated with that icon is displayed in the vicinity thereof (refer to Japanese patent application laid-open No. 2003-209719).

SUMMARY OF THE INVENTION

However, in a user interface of a display device using a transparent display, there has been a case where it is unclear whether a user should touch the transparent display from a back face side or from a front face side, or it becomes difficult for the user to operate the transparent display particularly in a state where the transparent display is held in one hand.

Accordingly, the present invention is intended to improve the operability of touch operation in a display device which has a transparent display with a touch operation being carried out from opposite sides thereof, i.e., a front face and a back face.

According to a first aspect of the present invention, there is provided a display device in which a touch operation can be carried out from opposite sides thereof, a front face and a back face, and which comprises:

a detection unit configured to detect a touch operation on the front face and a touch operation on the back face; and a control unit configured to carry out display control of graphics data for touch operation;

wherein said graphics data includes a first component which assumes a touch operation from either one of the front face and the back face, and a second component which assumes a touch operation from a side opposite to the side from which the touch operation is assumed by said first component;

wherein said control unit first displays only the first component on a screen, decides a content of the second component according to a touch operation with respect to the first component, and displays said second component on the screen, after the touch operation with respect to said first component has been carried out.

According to a second aspect of the present invention, there is provided a display device in which a touch operation can be carried out from opposite sides thereof, a front face and a back face, and which comprises:

a detection unit configured to detect a touch operation on the front face and a touch operation on the back face; and a control unit configured to carry out display control of graphics data according to a touch operation;

wherein said control unit carries out display control in such a manner that in cases where sliding touch operations on the front face and the back face have been carried out at the same time, sliding directions of the touch operations on the front face and the back face are determined, and when the sliding directions of the touch operations on the front face and the back face are opposite to each other, an object displayed on a screen is caused to rotate around a virtual axis of rotation parallel to the screen.

According to a third aspect of the present invention, there is provided a control method for a display device in which a touch operation can be carried out from opposite sides thereof, a front face and a back face, said method comprising:

a detection step of detecting a touch operation on the front face and a touch operation on the back face; and a control step of carrying out display control of a graphics data for touch operation;

wherein said graphics data includes a first component which assumes a touch operation from either one of the front face and the back face, and a second component which assumes a touch operation from a side opposite to the side from which the touch operation is assumed by said first component; and wherein said control step includes:

a step of first displaying only the first component on a screen;

a step of deciding a content of the second component according to a touch operation with respect to the first component; and a step of displaying said second component on the screen, after the touch operation with respect to said first component has been carried out.

According to a fourth aspect of the present invention, there is provided a control method for a display device in which a touch operation can be carried out from opposite sides thereof, a front face and a back face, said method comprising:

a detection step of detecting a touch operation on the front face and a touch operation on the back face; and a control step of carrying out display control of graphics data according to a touch operation;

wherein in said control step, display control is carried out in such a manner that in cases where sliding touch operations on the front face and the back face have been carried out at the same time, sliding directions of the touch operations on the front face and the back face are determined, and when the sliding directions of the touch operations on the front face and the back face are opposite to each other, an object displayed on a screen is caused to rotate around a virtual axis of rotation parallel to the screen.

According to the present invention, in a display device which has a transparent display with a touch operation being carried out from opposite sides thereof, i.e., a front face and a back face, it is possible to improve the operability of the touch operation.

Further features of the present invention will become apparent from the following description of exemplary embodiments with reference to the attached drawings.

BRIEF DESCRIPTION OF THE DRAWINGS

FIG. 10A shows a list of display change operations in a globe mode and a three-dimensional coordinate system, respectively, in the fourth embodiment.

FIGS. 11A through 11D are conceptual diagrams each showing a rotation operation and a movement operation in the globe mode in the fourth embodiment.

FIGS. 12A and 12B are conceptual diagrams showing a scaling operation in the fourth embodiment.

FIG. 13 is a list of display change operations in a 2D (two-dimensional) map mode in the fourth embodiment.

FIG. 15 is a list of display change operations in a 3D (three-dimensional) map mode in the fourth embodiment.

FIG. 21 is a list of touch operations with respect to the 3D object in the fifth embodiment.

FIGS. 22A and 22B are conceptual diagrams showing a rotation operation of the 3D object in the fifth embodiment. FIG. 22C shows the relation between a finger fixed while touching among the fingers on the front face and the back face, and the center of rotation of the 3D object.

FIGS. 23A and 23B are conceptual diagrams showing a Z axis rotation operation of the 3D object in the fifth embodiment.

FIGS. 25A and 25B are conceptual diagrams showing a moving operation of the 3D object in the fifth embodiment.

FIGS. 26A, and 26B show lists of display change operations of the 3D object and the axes of coordinates and the directions of rotation in the fifth embodiment. FIG. 26C the axes of coordinates and the directions of rotation.

FIGS. 27A and 27B are conceptual diagrams showing rotation operations of the 3D object in a ϕ direction and in a θ direction in the fifth embodiment.

DESCRIPTION OF THE EMBODIMENTS (First Embodiment)

Figure 1:
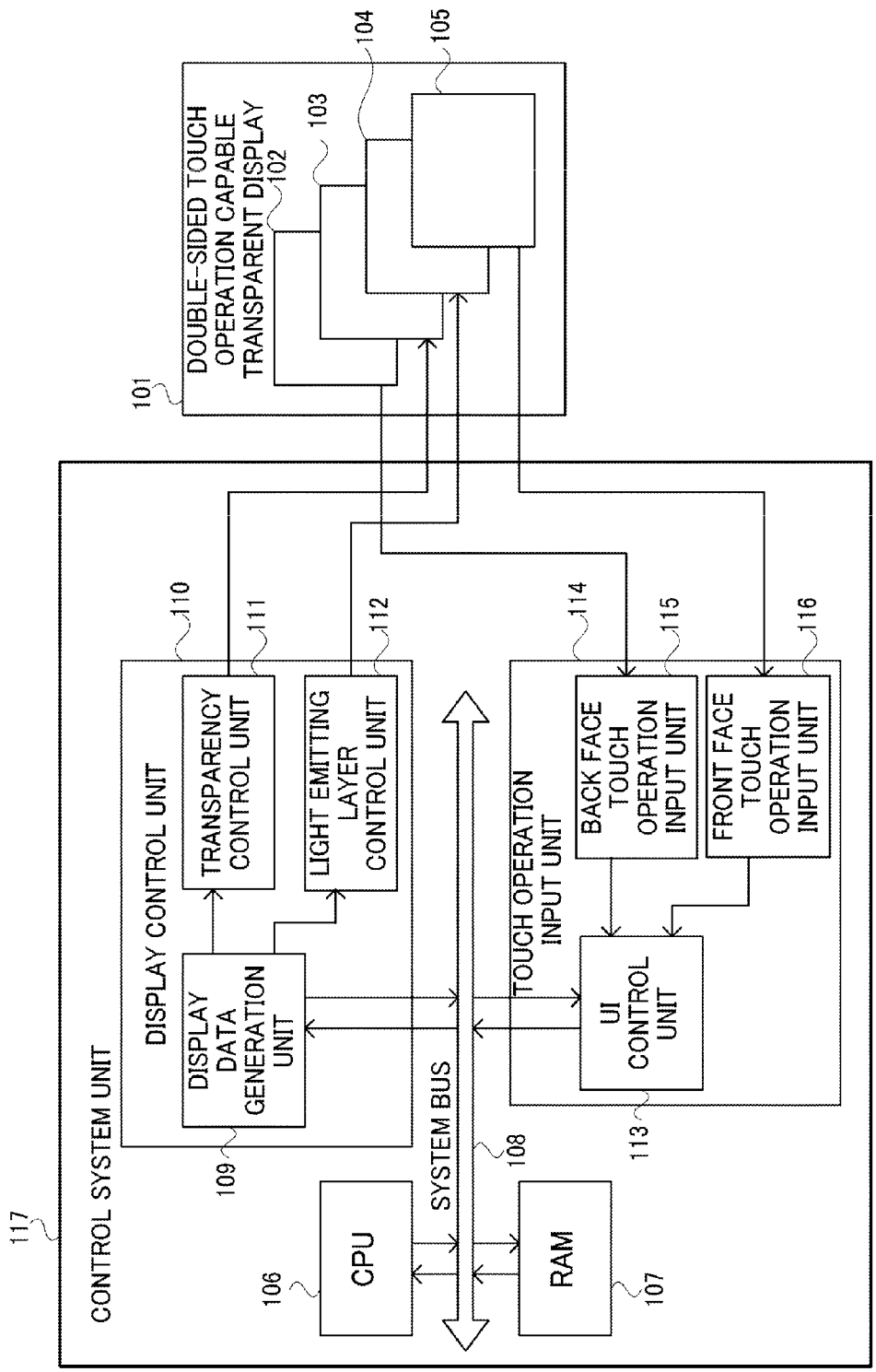
FIG. 1 is a block diagram showing the construction of a portable terminal according to a first embodiment, a second embodiment and a third embodiment of the present invention.

FIG. 1 is a block diagram of a display device for a portable terminal or a personal digital assistant which is one embodiment of the present invention. The display device of this embodiment is composed of a transparent display 101 compatible with double-sided touch operation and a control system unit 117.

The transparent display 101 is a transparent display panel in which a touch operation can be carried out from the opposite surfaces thereof, i.e., a front face and a back face. The transparent display 101 is composed of a back touch panel 102, a liquid crystal shutter 103, a transparent light emitting panel 104, and a front touch panel 105.

The front touch panel 105 has a touch sensor provided on its transparent panel surface for detecting a touch operation from the front face of the portable terminal. Detection of the touch operation is carried out by detecting that a user contacted a screen, and by detecting the coordinate position of a contact point on the screen which was contacted by the user. Similarly, the back touch panel 102 has a touch sensor provided on its transparent panel surface for detecting a touch operation from the back face of the portable terminal.

The liquid crystal shutter 103 is a liquid crystal panel which serves to perform a change of the transmittance for each pixel. The liquid crystal shutter 103 is formed with a liquid crystal cell for each pixel, and the transmittance of the liquid crystal shutter 103 changes according to the gray level of each pixel from on to off. As a result of this, the gray level of transparency for each pixel is controlled.

The transparent light emitting panel 104 is an image display panel which has a plurality of light self-emitting elements formed on a transparent substrate. For each pixel, individual RGB (red, green and blue) light emitting elements are arranged on the transparent light emitting panel 104. The transparent light emitting panel 104 becomes transparent at the time of non-emission of light, (in a non-display state), and emits light with a color based on RGB information specified at the time of light emission (in a display state).

The control system unit 117 controls the transparent display 101, so that it carries out display output control, touch operation input control, and coordinated operation control of input/output for these. The control system unit 117 is composed of a CPU 106, a RAM 107, a system bus 108, a display control unit 110, and a touch operation input unit 114.

The CPU 106, the RAM 107, and the system bus 108 mainly serve to achieve the control by software. Programs and a variety of kinds of data such as graphics data for user interfaces, control data, etc., are stored in the RAM 107. The CPU 106 reads in data from the RAM 107, and sends out control commands to the system bus 108 according to the data thus read. The system bus 108 serves to connect the CPU 106, the RAM 107, the display control unit 110, and the touch operation input unit 114 to one another. The transmission and reception of data and commands between the control blocks are carried out by way of the system bus 108. Here, note that the CPU 106 and the display control unit 110 may be constructed as an integral unit, or the CPU 106 and a UI (user interface) control unit 113 may be constructed as an integral unit, or the CPU 106, the display control unit 110 and the UI control unit 113 may be constructed as an integral unit.

The display control unit 110 is composed of a display data generation unit 109, a transparency control unit 111, and a light emitting layer control unit 112. The display data generation unit 109 generates display data according to the control from the CPU 106. The display data are graphics data for user interfaces which have been stored in the RAM 107 and data which are built and generated from image data and which correspond to a display image. The graphics data for user interfaces include data of images such as a menu, an icon, a selection button, and so on, which construct a GUI (graphical user interface) which receives operations from the user.

The display data contain transparency information for each pixel together with RGB information for each pixel, corresponding to display screen coordinates. With the display data in such a data format, individual transparency is set for each pixel with respect to all the pixels. The transparency control unit 111 carries out generation and transmission of control data of the transparency of the liquid crystal shutter 103, as well as the update of the data. The light emitting layer control unit 112 carries out generation and transmission of RGB data to be displayed on the transparent light emitting panel 104, as well as the update of the data.

The touch operation input unit 114 receives detection information of the touch sensors from the back touch panel 102 and the front touch panel 105, and processes touch operation information.

The back touch operation input unit 115 acquires back side touch operation detection information from the back touch panel 102, and the front touch operation input unit 116 acquires the front side touch operation detection information from the front touch panel 105, so that they carry out processing to generate individual pieces of touch operation coordinate information, respectively.

The UI control unit 113 receives these pieces of touch operation coordinate information, and carries out motion control of the terminal according to the touch operations, thereby performing user interface control to achieve the user interfaces of the touch operations.

Figure 2:
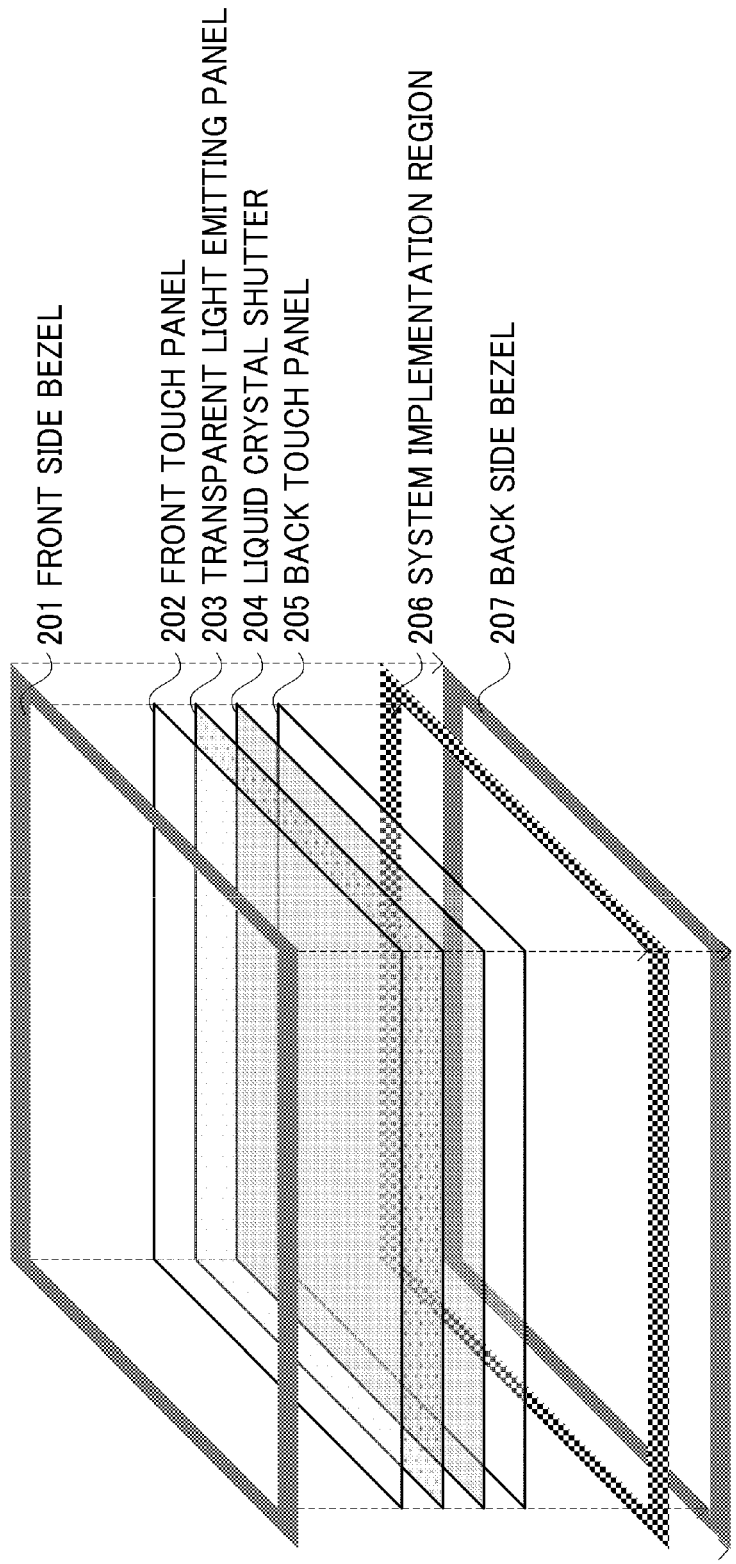
FIG. 2 is a structure view showing an implementation form of a portable terminal display device according to the first embodiment, the second embodiment and the third embodiment of the present invention.

Next, reference will be made to an implementation schematic diagram of the portable terminal or personal digital assistant compatible with double-sided touch operation using this transparent display shown in FIG. 2. The construction is such that the front touch panel 202, the transparent light emitting panel 203, the liquid crystal shutter 204 and the back touch panel 205 are laminated or stacked from above in this order. This construction corresponds to the transparent display 101 in FIG. 1. These members of the transparent display of such a laminated construction are sandwiched between a front side bezel 201 and a back side bezel 207, so that they are fixed and supported thereby. The substrate, various devices, a power supply, a charging battery, and so on, which together achieve the control system unit 117 in FIG. 1, are implemented in a system implementation region 206 between the bezels 201, 207.

Figure 3A:
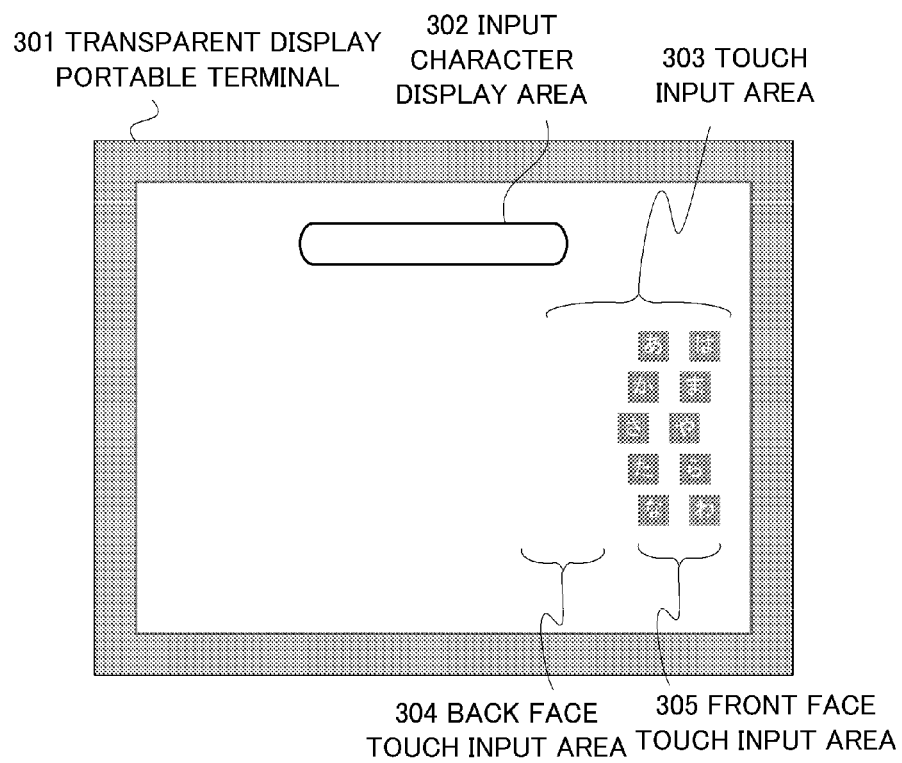
FIGS. 3A and 3B are conceptual diagrams each showing a user interface display and touch operation in the first embodiment.
Figure 3B:
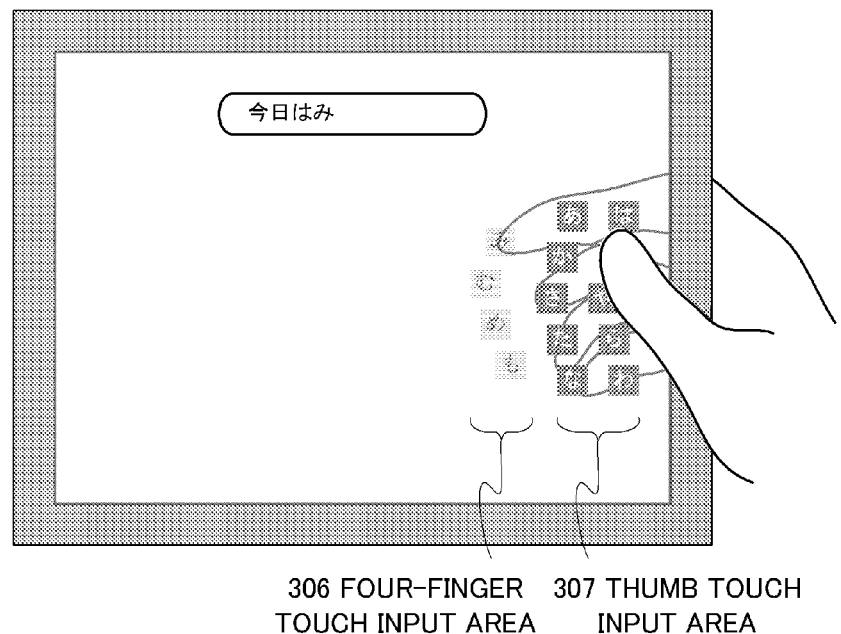

Now, the operation of the display device of this embodiment will be explained by using examples of a display screen and an operation image which are shown in FIG. 3A and FIG. 3B. FIG. 3A is a view showing an example in which Japanese input user interface display is carried out with the transparent display portable terminal or personal digital assistant 301. The characters being inputted are displayed on an input character display area 302. A touch input area 303 is displayed on the screen at the right side thereof. In this example, assuming a form in which the terminal is held and operated by a right hand of the user, the touch input area 303 is a region in which when the terminal is held by the right hand, the user can carry out a touch operation in a natural or smooth manner.

The touch input area 303 further includes a back face touch input area 304 and a front face touch input area 305. In the front face touch input area 305, there are arranged icons which are to be touched from the front screen face. The user specifies or designates Japanese consonants "a", "ka", "wa" by front face touch operations. In the back face touch input area 304, there are arranged icons which are to be touched from the back screen face. These icons represent characters corresponding to vowels "i", "u", "e", and "o", in a row of a consonant which has been touched on the front screen face with a thumb of the user. The display content in the back face touch input area 304 is changed according to a consonant specified or designated in the front face touch input area 305. One hiragana (Japanese cursive syllabary) character of Japanese input is uniquely decided by touch designation of a consonant from the front face, and touch specification of a vowel from the back face. The character thus decided is displayed in the input character display area 302, so that the user can confirm the inputted character. Here, note that in FIG. 3A, those icons which are displayed in the back face touch input area 304 are not illustrated.

FIG. 3B is a view showing a state where the user carries out Japanese input operation, while holding the screen with the right hand. In this figure, a thumb touch input area 307 corresponds to the front face touch input area 305 in FIG. 3A, and a four finger touch input area 306 corresponds to the back face touch input area 304 in FIG. 3A. A first component, which is a GUI component to which a touch operation from the front face is assumed to be performed, is displayed in the thumb touch input area 307. A second component, which is a GUI component to which a touch operation from the back face is assumed to be performed, is displayed in the four finger touch input area 306.

In general, when the user holds the display device as in this embodiment, the way for the user to hold it with one hand becomes such that the thumb comes to the front face of the display, whereas the other four fingers, i.e., the index finger, the middle finger, the ring finger, and the little finger come to the back face of the display. Accordingly, the user is able to perform touch operation in a natural or smooth manner while holding the display device, by carrying out a touch operation with respect to an icon of a consonant displayed in the front face touch input area 305 with the use of the thumb, and by carrying out a touch operation with respect to icons of vowels displayed in the back face touch input area 304 with the use of the remaining four fingers. In this case, the index finger, the middle finger, the ring finger, and the little finger can carry out touch operations of "i", "u", "e", and "o", respectively. Thus, by touching the screen in the form of clamping it with the thumb and the other four fingers thereby to specify or designate a consonant and a vowel, the user can input an arbitrary character.

At this time, in this embodiment, the back face touch input area 304 and the front face touch input area 305 are displayed in colors different from each other. As a result of this, it becomes easy for the user to determine whether an icon is one which prompts a touch operation from the back face or a touch operation from the front face.

In addition, in this embodiment, as for the display areas, the display position of an icon group in the back face touch input area 304 and that of an icon group in the front face touch input area 305 are made different from each other. Specifically, the front face touch input area 305 is arranged at a side close to an end of the portable terminal (i.e., a side close to the right side end in FIG. 3A). The back face touch input area 304 is arranged at a side more remote from the end of the portable terminal than the front face touch input area 305. (i.e., at the left side of the front face touch input area 305 in FIG. 3A). As a result of this, the individual touch input areas are arranged in positions close to the positions of the fingers on the front face and the back face of the screen, respectively, in a state where the terminal is held by the right hand of the user, as shown in FIG. 3B, and hence, touch operability can be improved.

Here, note that in this embodiment, there has been described as an example the case where the terminal is held by the right hand of the user and is operated with the right hand, but in cases where the terminal is held by the left hand of the user and is operated with the left hand, the back face touch input area and the front face touch input area are arranged at a side close to a left side end of the terminal. Specifically, the front face touch input area, in which the icons to be touch operated with the thumb are arranged, is arranged at a side close to the left side end of the terminal, and the back face touch input area, in which the icons to be touch operated with the remaining four fingers are arranged, is arranged at the right side of the front face touch input area.

Next, reference will be made to the order of change of a menu and operation timing at which a decision by touch operation is made. As shown in FIG. 3B, in accordance with (or in association with) the result of an input (touch operation) to the thumb touch input area 307 in which front face touch operations are carried out, icons are displayed in the four finger touch input area 306 in which back face touch operations are carried out. Specifically, a GUI for front face touch operation is displayed as a first level of menu, and in association with a front face touch operation with respect to this, a GUI for back face touch operation is displayed as a second level of menu. That is, the levels are composed of a menu for front touch operation, and a menu for back face touch operation, and the display of the menu for back face touch operation is made to cooperate with an operation content with respect to the menu for front touch operation. Thus, in this embodiment, touch operations can be carried out from opposite sides of the screen, i.e., the front face and the back face thereof, by a single hand, and so, a decision operation for icon selection within a menu can be carried out in a quick manner.

In cases where touch operations from the opposite sides, the front face and the back face, are received, timings at which the touch operations of the individual faces are validated, respectively, are set as follows. First, the display and operation in the front face touch input area 305 are validated. Then, after a selection item is decided in the menu for front face touch operation by a touch operation of the user, the display and operation in the back face touch input area 304 are validated. In cases where touch operations are continuously received, such actions are repeated. That is, the user will carry out a front face touch operation and a back face touch operation in an alternate manner.

Here, note that a back face touch operation menu may also be set as a first level menu, and a front face touch operation menu may be set as a second level menu. That is, the display and operation in the back face touch input area 304 may also be first validated, and the display and operation in the front face touch input area 305 may be validated after a decision of selection in the back face touch operation menu is made by the user. In this case, a GUI component, which is displayed in the back face touch input area 304 and to which a touch operation from the back face is assumed to be performed, becomes a first component, and a GUI component, which is displayed in the front face touch input area 305 and to which a touch operation from the front face is assumed to be performed, becomes a second component.

Figure 4:
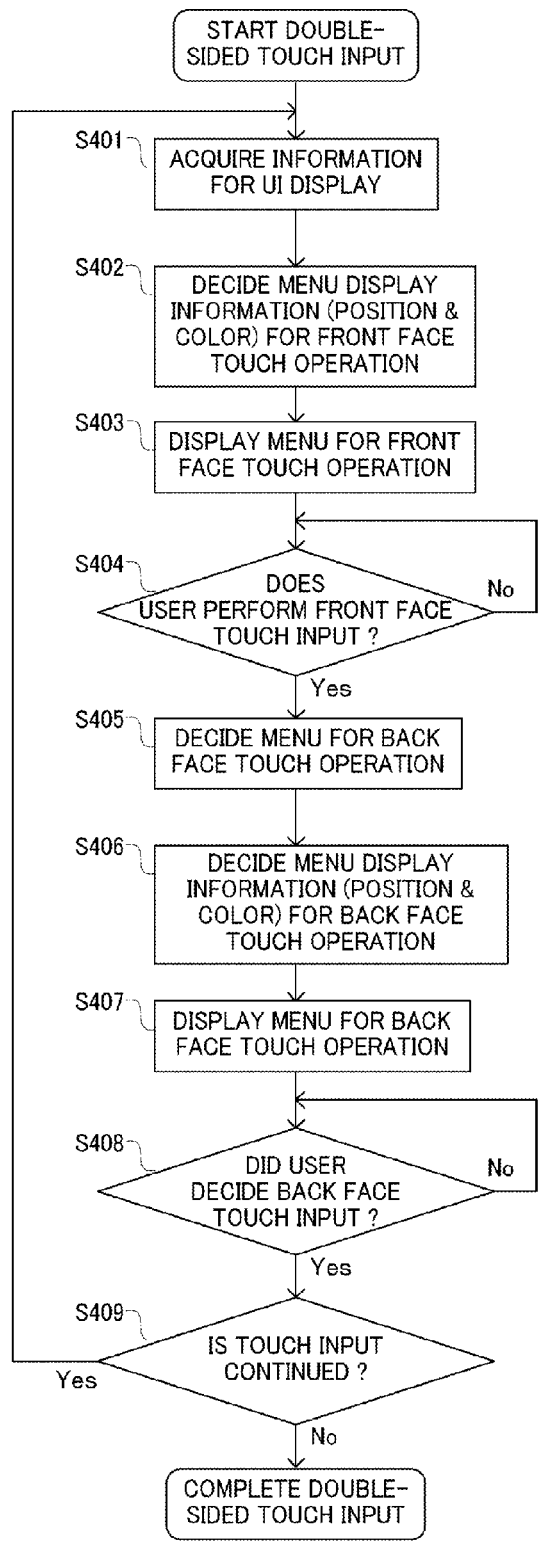
FIG. 4 is a flow chart showing processing for the user interface display and the touch operation in the first embodiment.

Now, the processing flow and display action of menus, icon display, and touch operations at the time of carrying out a touch operation by one hand, as shown in FIG. 3A and FIG. 3B, will be described by using a flow chart in FIG. 4 and the construction view in FIG. 1.

When the CPU 106 receives a command of starting to display a user interface and starts the display of the user interface, the CPU 106 acquires information for displaying the user interface that is stored in the RAM 107, in step S401. The information for displaying the user interface includes graphic components such as icons, menus and so on for display, and action information at the time of touch operation.

Subsequently, the CPU 106 extracts a touch operation menu for the front face touch input area out of the user interface display information, and sends it out to the display control unit 110. Thereafter, the control flow goes to step S402, where display information on the menu for front face touch operation is decided by the display data generation unit 109 in the display control unit 110. The information decided here is a display position and a display color. The display data generation unit 109 decides to display the display position in a region in which a right hand thumb touch operation can be made by the user, in the case of the menu being for right hand operation, or in a region in which a left hand thumb touch operation can be made, in the case of the menu being for left hand operation. The display color is set to a display color which has been specified for front face touch operation in advance. The display data generation unit 109 constructs a display image and generates display data by combining display information on the menu for front face touch operation thus decided, with other graphic components, background and images.

In step S403, the display control unit 110 displays the menu for front face touch operation. The display data constructed by the display data generation unit 109 are sent out to the transparency control unit 111 and the light emitting layer control unit 112, so that transparency data and image data are generated in these control units 111, 112, respectively, and are sent out to the transparent display 101. The liquid crystal shutter 103 adjusts the transmittance for each pixel based on the transparency data, and the transparent light emitting panel 104 displays an image according to the image data.

Then, in step S404, a user's front face touch operation is waited. When the user performs a front face touch operation, the control flow goes to step S405. A waiting state continues in step S404 until it is determined that a touch operation has been carried out. At this time, the UI control unit 113 validates an input from the front touch operation input unit 116, and invalidates an input of the back touch operation input unit 115, thereby making it possible to receive the front face touch operation.

When the user performs a front face touch operation, the control flow goes to step S405. The CPU 106 sends out an instruction for updating the menu for back face touch operation to the display data generation unit 109 according to the information on the front face touch operation.

Subsequently, in step S406, the display data generation unit 109 decides display information on the menu for back face touch operation. At this time, the display data generation unit 109 decides that the menu for back face touch operation is displayed with a different color from the display color of the menu for front face touch operation decided in step S402. A display area is arranged in the vicinity of the menu for front face touch operation near to the middle of the screen. According to this arrangement, it becomes possible for the user to carry out touch operations on the front face and the back face in a state of the display device being held by a single hand. The display data generation unit 109 constructs a display image and generates display data by combining display information on the menu for back face touch operation thus decided, with other graphic components, background and images.

In step S407, the display control unit 110 displays the menu for back face touch operation. The display data constructed by the display data generation unit 109 are sent out to the transparency control unit 111 and the light emitting layer control unit 112, so that transparency data and image data are generated in these control units 111, 112, respectively, and are sent out to the transparent display 101. The liquid crystal shutter 103 adjusts the transmittance for each pixel based on the transparency data, and the transparent light emitting panel 104 displays an image according to the image data.

Then, in step S408, a user's back face touch operation is waited. At this time, the UI control unit 113 validates an input from the back touch operation input unit 115. When the user performs a back face touch operation, an input instruction content by the user's touch operation is decided in combination with the information on the front face touch operation inputted in step S404.

Thereafter, the control flow goes to step S409, and if touch operation is to be continued, a return to step S401 is carried out, so that processing of an instruction input by touch operation as referred to above will be repeated. On the other hand, in cases where the end of touch operation is instructed, such as by a completion menu being selected, etc., the processing of the instruction input by touch operation is ended.

According to the above-mentioned flow, it is realized that the user can carry out optimum touch operations on the front face and the back face in the state of the display device being held by his or her single hand.

(Second Embodiment)

Reference will be made to the operation of a display device in this second embodiment by using examples of a display screen and an operation image shown in FIG. 5A through FIG. 5D. The construction and implementation form of a portable terminal having a transparent display are the same as those in FIG. 1 and FIG. 2.

Figure 5A:
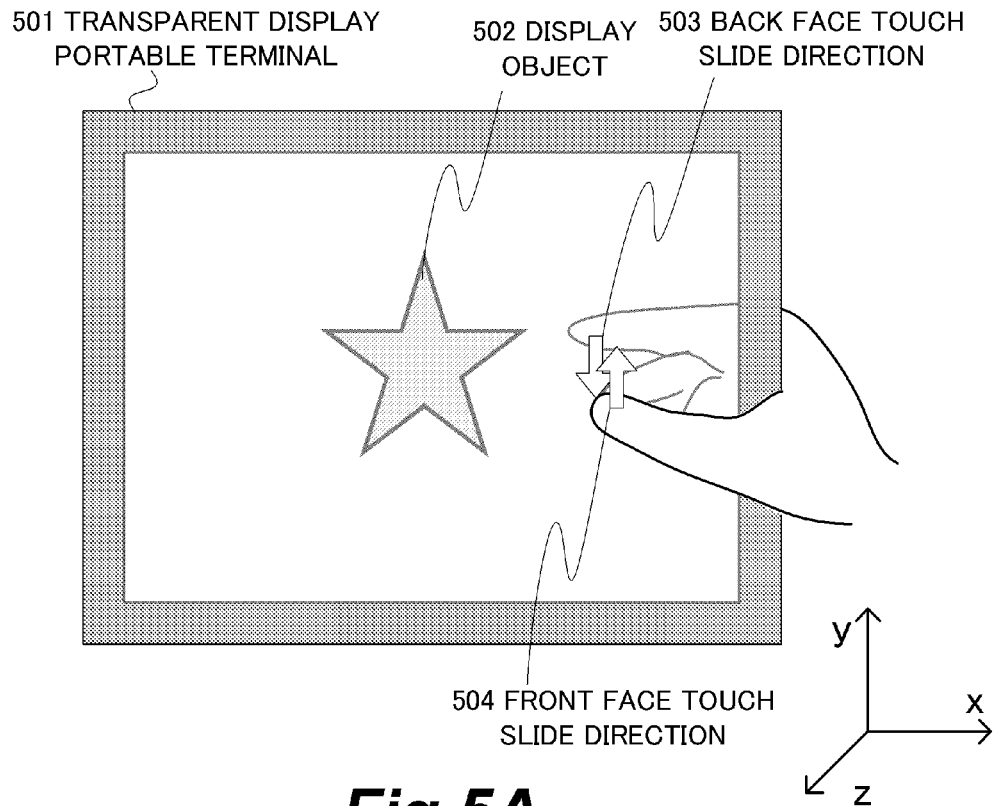
FIGS. 5A through 5D are conceptual diagrams each showing a user interface display and touch operation in the second embodiment.

FIG. 5A shows a state in which a user holds a transparent display portable terminal 501 in the form of clamping it with a thumb and an index finger. A display object 502 is in a two-dimensional plane from a display point of view, but as data inside the terminal, it is composed of three-dimensional data. That is, it is assumed that the display object 502 has data in x, y and z directions, respectively, so that it can be displayed in a state of being rotated in a virtual three-dimensional space by means of user's operations. At this time, a front face touch sliding direction 504 indicates an operation to slide upward in a state where the front face is touched with the thumb. A back face touch slide direction 503 indicates an operation to slide downward in a state where the back face is touched with the index finger. At this time, the touch operations on the front face and the back face are carried out in the same region, so that the touch operations become such that the thumb and the index finger are rubbed with each other in the upward and downward directions, respectively, on the opposite sides of the transparent display. Although in this embodiment, the touch operations to slide in the upward and downward directions have been shown as an example, the sliding directions are not limited to the upward and downward directions, as long as slide operations are carried out in the same and opposite directions.

Figure 5B:
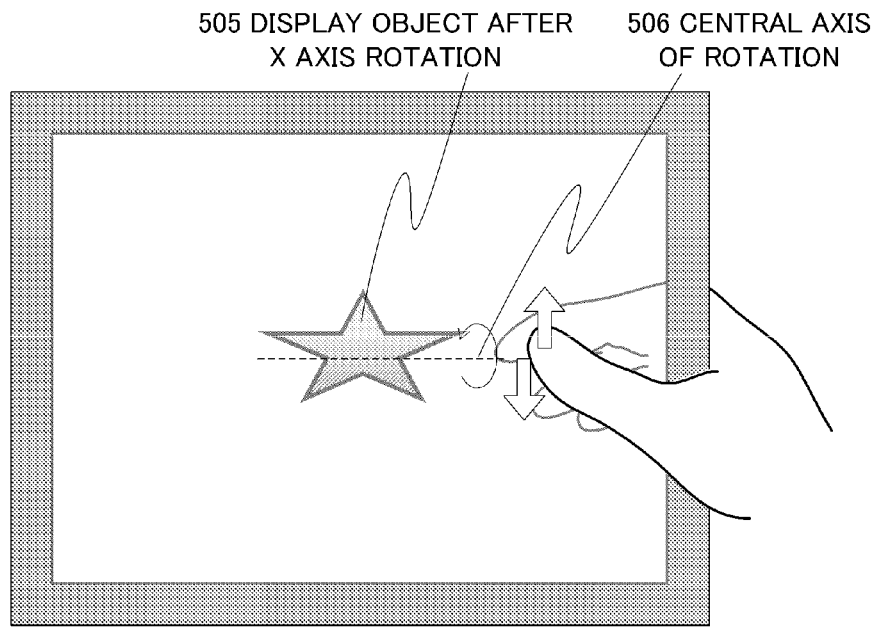

FIG. 5B shows a change of display of the display object 502 at the time of the above-mentioned touch operations being carried out, as a display object 505 after the rotation thereof around an x axis. In FIG. 5B, there is displayed a state in which the display object 502 has been rotated about an axis of rotation, which passes through the touch areas of the front face and the back face and which is vertical to the sliding directions on the front face and the back face, in a virtual three-dimensional space. In this embodiment, there is displayed a state in which the display object 502 has been rotated about a virtual axis extending along an x direction indicated by a central axis of rotation 506, in a vertical direction with respect to the screen.

An operation to pinch or clamp the transparent display from its front face and back face by using the thumb finger and the index finger of a single hand, and to slide them in such a manner that the sliding directions of both the fingers become opposite to each other is intuitively the same as an operation of rotating a shaft or axis held by both the fingers. In the display device of this second embodiment, in cases where this operation is detected, a display is carried out in which the display object is caused to rotate around a virtual axis corresponding to that axis. With this, it becomes possible for the user to input a complicated display instruction of rotating the display object around an axis parallel to the screen by a simple operation.

Figure 5C:
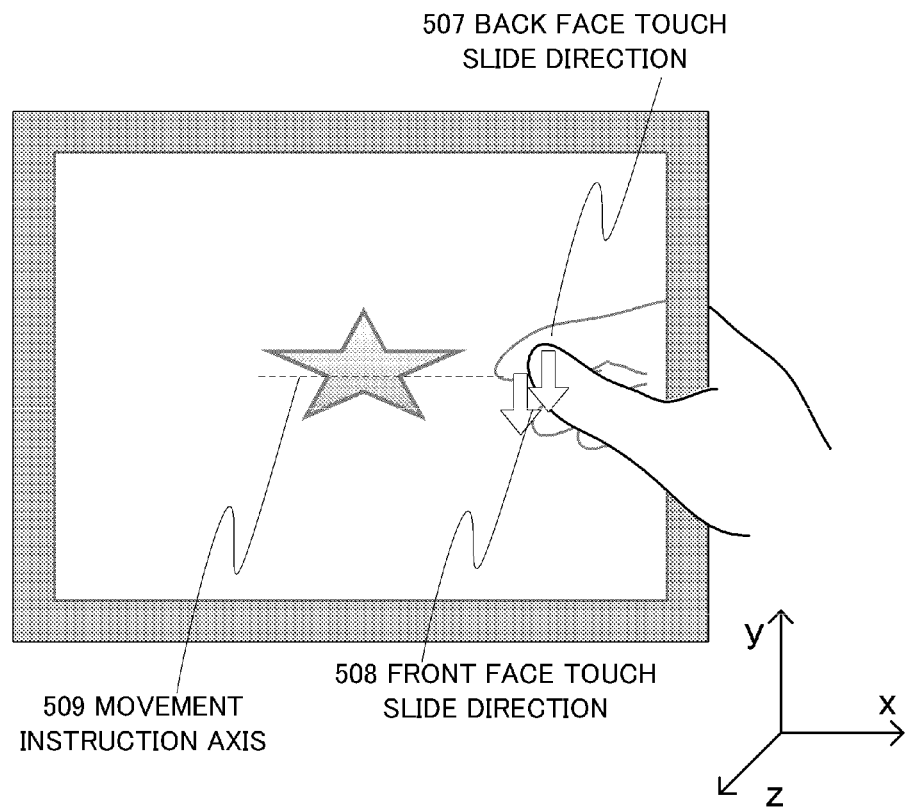
Figure 5D:
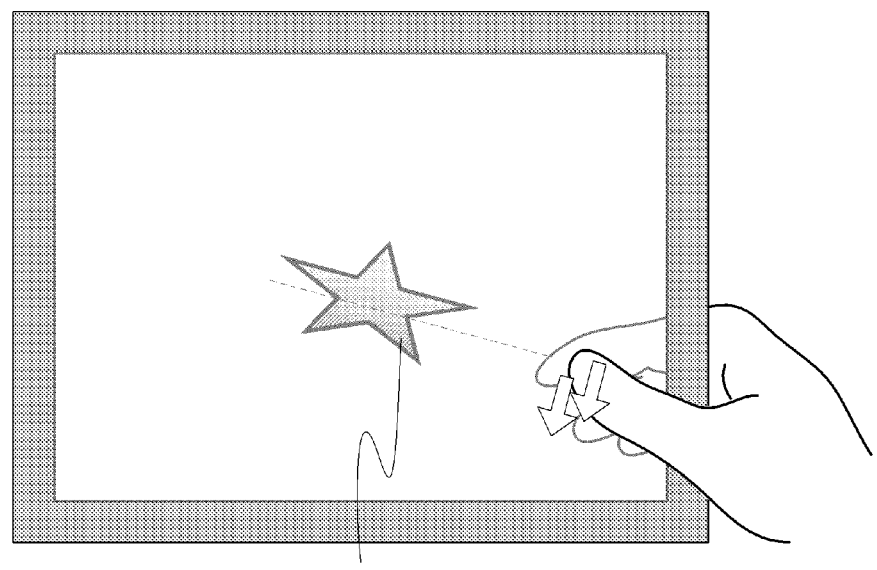

Next, FIG. 5C shows an operation in which a back face touch sliding direction 507 and a front face touch sliding direction 508 are the same direction. In this embodiment, by this operation, an instruction is inputted which rotates the display object around that end of a movement instruction axis 509 in a virtual three-dimensional space which is at a side opposite to an end thereof at which a touch operation is carried out, on an xy plane (i.e., a plane parallel to the screen in the virtual three-dimensional space). A display object 510 after its rotational transfer in the xy plane is shown in FIG. 5D.

With general touch operation displays, touch and slide operations are operations for inputting an instruction to cause translational movement of a display object on an xy plane. In the past, it has been difficult for a user to input a complicated instruction of rotating a display object around a certain center of rotation in an xy plane, particularly in one hand touch operation. In this embodiment, however, by means of an operation to pinch the transparent display from opposite sides thereof (a front face and a back face) with fingers, and to slide the fingers in the same direction, it becomes possible for the user to input easily a complicated instruction of rotating a display object around a certain center of rotation in an xy plane, by a one hand touch operation.

Figure 6:
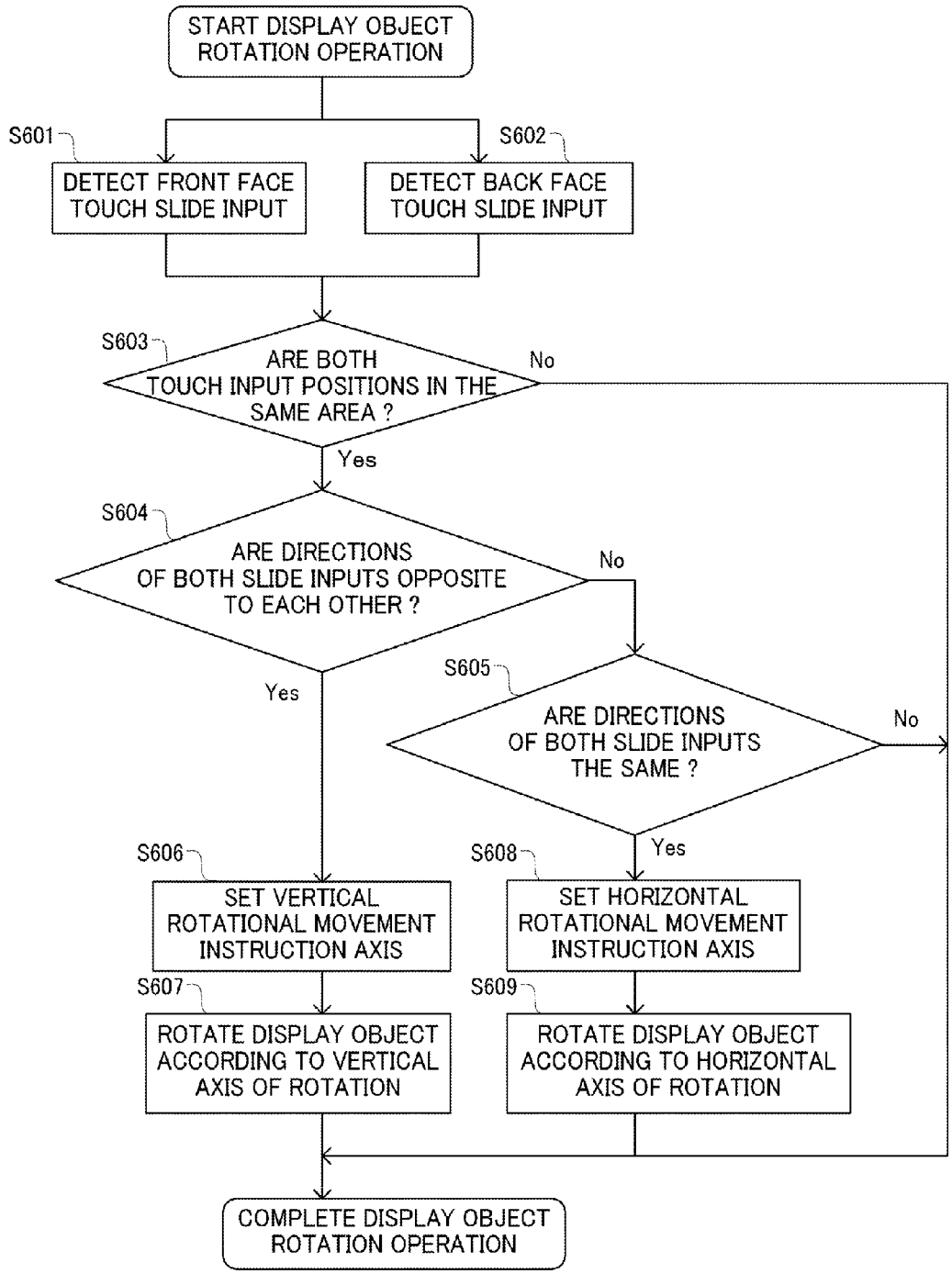
FIG. 6 is a flow chart showing processing for the user interface display and the touch operation in the second embodiment.

Now, reference will be made to a flow and a display action for the above-mentioned touch operation input processing by using a flow chart in FIG. 6, and the construction view in FIG. 1.

First, in step S601, the front touch operation input unit 116 detects a front touch slide operation. At the same time, in step S602, the back touch operation input unit 115 detects a back face touch slide operation. A result of detection is sent out to the UI control unit 113.

When touch operations on the front face and the back face are detected, the control flow or processing then goes to step S603, and the UI control unit 113 determines whether the touch operations on the front face and the back face are carried out in the same region. Here, in cases where a region in which a touch operation on the front face is carried out and a region in which a touch operation on the back face is carried out are not apart more than a predetermined threshold value from each other, the UI control unit 113 makes a judgment that the touch operations are carried out in the same region on the front face and the back face, Specifically, in cases where the region in which the touch operation on the front face is carried out and the region in which the touch operation on the back face is carried out are both within a certain predetermined range in which they are regarded as the same range, the UI control unit 113 makes a judgment that the touch operations are carried out in the same region on the front face and the back face. On the other hand, in cases where touch operations are not carried out in the same region on the front face and the back face, the processing is ended with a change of the display state being not carried out with respect to the display object. In cases where a determination is made that the operations are carried out in the same region, then in step S604, the UI control unit 113 determines whether the directions of the slide operations of the front face touch operation and the back face touch operation are opposite to each other. As a result of the determination, when it is Yes, the UI control unit 113 sends out touch operation information and slide operation information on the front face and the back face to the CPU 106, and the processing then advances to step S606. In step S606, the CPU 106 sets, from the slide operation information, a virtual axis of rotation for carrying out a vertical rotational transfer or movement. The vertical rotational movement is that the display object is caused to rotate around an axis parallel to the xy plane, as explained in FIG. 5B. This axis of rotation is called an axis of vertical rotation. Display object information and the information of the axis of rotation thus set are sent to the display data generation unit 109. Then, in step S607, the display data generation unit 109 generates an image in which the display object has been transferred or moved by rotation in such a manner that it is rotated about the axis of vertical rotation according to an amount of slide operation. This completes the operation for inputting to the display device an instruction for causing the display object to rotate in the vertical direction with respect to the screen.

In cases where the result of the determination is No in step S604, the processing advances to step S605. In step S605, the UI control unit 113 determines whether the directions of the slide operations on the front face and the back face are the same. As a result of the determination, when it is Yes, the UI control unit 113 sends out touch operation information and slide operation information on the front face and the back face to the CPU 106, and the processing then advances to step S608. When the determination result in step S605 is No, processing is ended with a change of the display state being not carried out with respect to the display object.

In step S608, the CPU 106 sets, from the relation between the slide operation information and the display position of the display object, a virtual axis of rotation for carrying out a horizontal rotational transfer or movement. The horizontal rotational movement is that the display object is caused to rotate around a certain point in the xy plane, as explained in FIG. 5D. Display object information and the information of the axis of rotation thus set are sent to the display data generation unit 109. Then, in step S609, the display data generation unit 109 generates an image in which the display object has been moved by rotation in such a manner that it is rotated about the axis of horizontal rotation by an amount of slide operation. This completes the operation for inputting to the display device an instruction for causing the display object to transfer or move through rotation in the horizontal direction with respect to the screen. However, the movement of the display object in cases where the directions of the slide operations on the front face and the back face are the same is not limited to a horizontal rotation movement, but may instead be a movement along the direction of movement of fingers in the horizontal plane.

The display object, having completed a rotational transfer or movement, is synthesized with other image components and a background in the display data generation unit 109, to generate the display data.

According to the above-mentioned flow, by making a front face touch operation and a back face touch operation in cooperation with each other, it becomes possible to input a complicated instruction in the form of a rotational transfer or movement of a display object in an intuitive and simple manner.

(Third Embodiment)

Figure 7A:
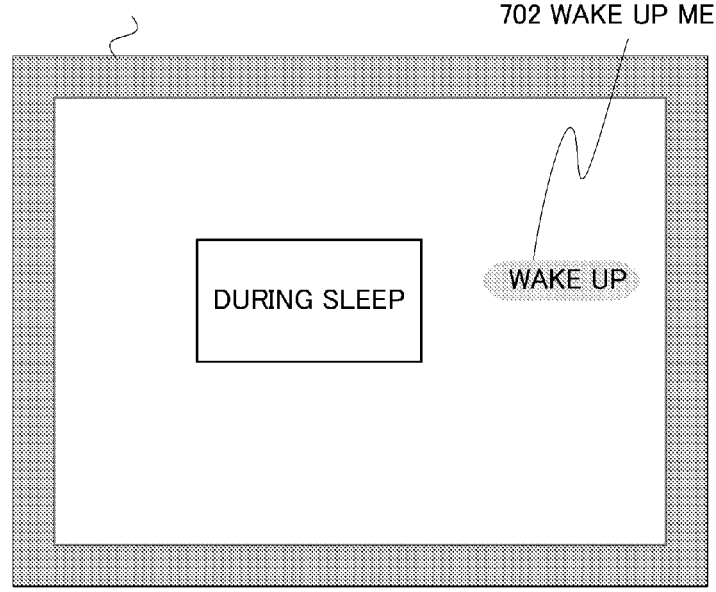
FIGS. 7A and 7B are conceptual diagrams each showing a user interface display and touch operation in the third embodiment.
Figure 7B:
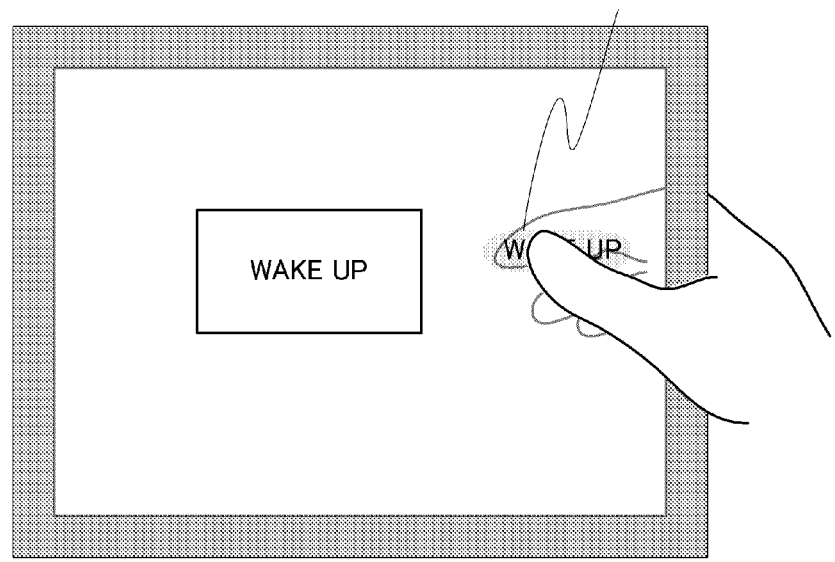

Now, reference will be made to the operation of a display device in this third embodiment by using examples of a display screen and an operation image which are shown in FIG. 7A and FIG. 7B. The construction and implementation form of a portable terminal having a transparent display are the same as those in FIG. 1 and FIG. 2.

FIG. 7A is a view showing a case where a transparent display portable terminal 701 is in a sleep state in which it does not receive touch operations in order to prevent malfunction and to reduce power consumption. It is preferable that the sleep state be released only by carrying out a special operation.

In this embodiment, reference will be made to the display device which is constructed such that it is released from a sleep state, only when touch operations are carried out at the same time with respect to a wake up menu 702 from opposite sides of a screen, i.e., a back face and a front face. The wake up menu 702 is a third component which is assumed to receive touch operations from the opposite sides, the back face and the front face, of the screen. FIG. 7B is a view showing a state in which a wake up operation 703 is carried out by a user touching the wake up menu 702 in a manner to be pinched by the thumb and the index finger of his or her one hand.

Figure 8:
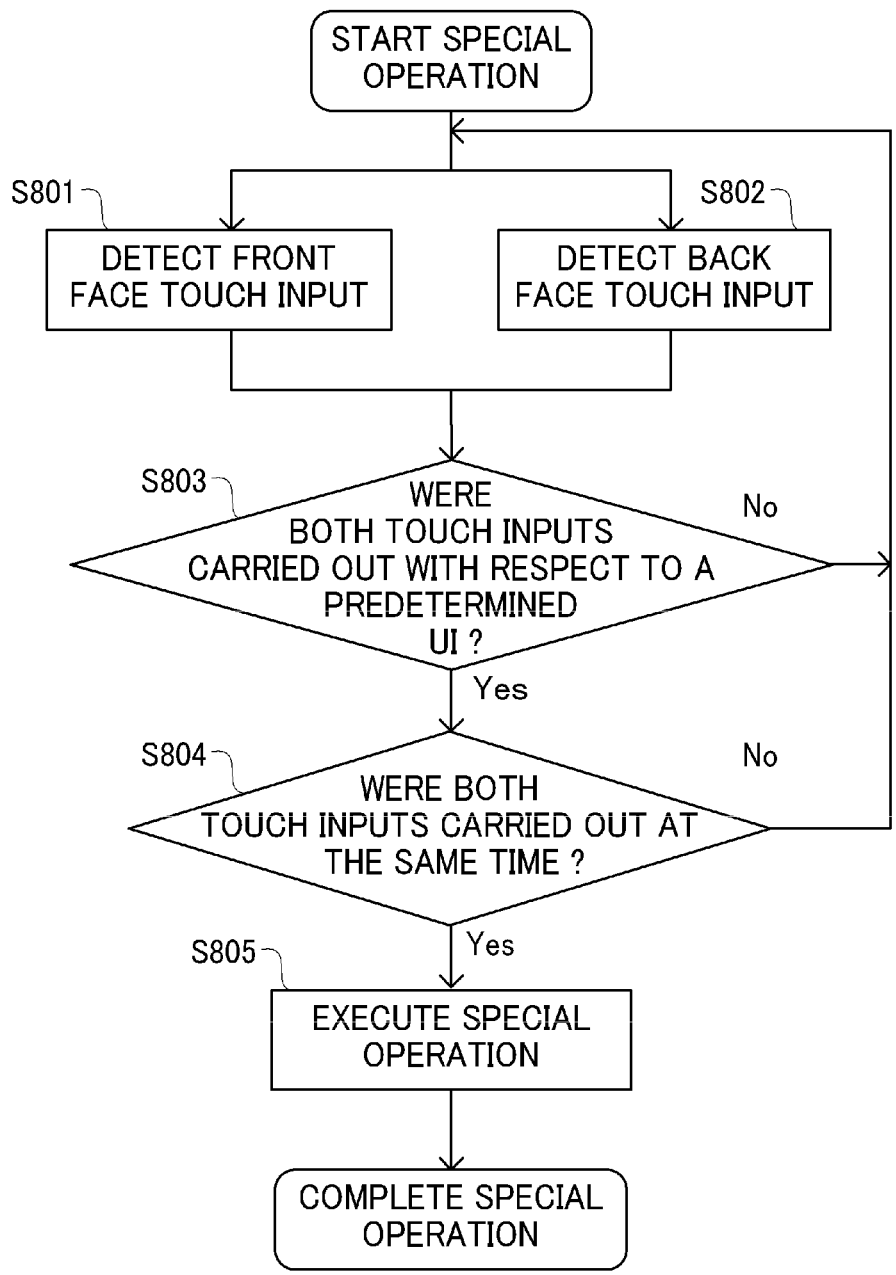
FIG. 8 is a flow chart showing processing for the user interface display and the touch operation in the third embodiment.

Reference will be made to a processing flow and a display action for touch operations at the time of doing a special operation in FIGS. 7A and 7B, by using a flow chart in FIG. 8, and the construction view in FIG. 1.

First, in step S801, the front touch operation input unit 116 detects a front touch operation. Similarly, in step S802, the back touch operation input unit 115 detects a front face touch operation.

When touch operations from the opposite sides of the screen are detected, the control flow or processing goes to step S803, where the UI control unit 113 determines whether both the results of detection indicate that the touch operations have been carried out with respect to a predetermined user interface. When the result of the determination is Yes, the control flow goes to step S804. On the other hand, when the determination result is No, the control flow returns to the first step, so that detection of touch operations is repeated again.

In step S804, the UI control unit 113 determines whether double-sided touch operations have been carried out at the same time. At this time, by determining whether touch operations on the front face and the back face are both detected within a certain period of time, the UI control unit 113 determines whether double-sided touch operations have been carried out at the same time. When the result of the determination is No, the control flow returns to the first step, so that detection of touch operations is repeated again.

When the result of the determination is Yes, then in step S805, the UI control unit 113 makes a judgment that an input to instruct the execution of a special operation (here, a wake-up action) has been made, and sends out the result to the CPU 106, after which it completes the processing of this flow. The CPU 106 carries out a wake-up action based on the result of the determination thus received.

As in this embodiment, by constructing such that a certain action (e.g., a wake up action) is performed only when touch operations are carried out at the same time from the opposite sides of the screen, it is possible to prevent such an action from being carried out accidentally due to an unintended touch operation. In addition, the touch operations to pinch the screen with the thumb and the index finger of one hand are operations which can be naturally carried out in a state where the portable terminal is held by hand, and hence, in cases where the user is intended to carry out a wake up action, an instruction for the execution thereof can be inputted by simple operations. Accordingly, the suppression of an unintended malfunction and the provision of simple operability when the user intends to use its function or action can be made compatible with each other.

(Fourth Embodiment)

Figure 9A:
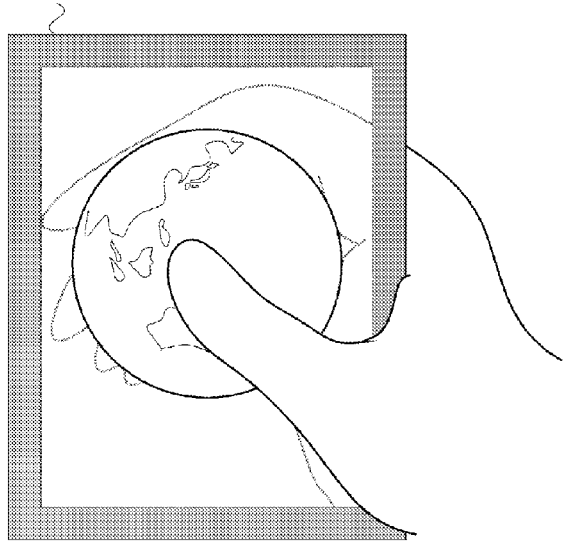
FIGS. 9A through 9C are conceptual diagrams each showing a user interface display and touch operation in a fourth embodiment.
Figure 9B:
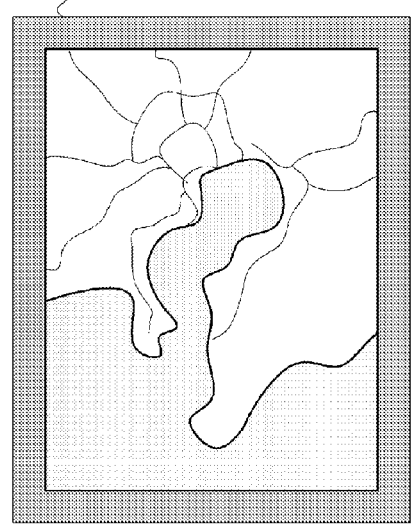
Figure 9C:
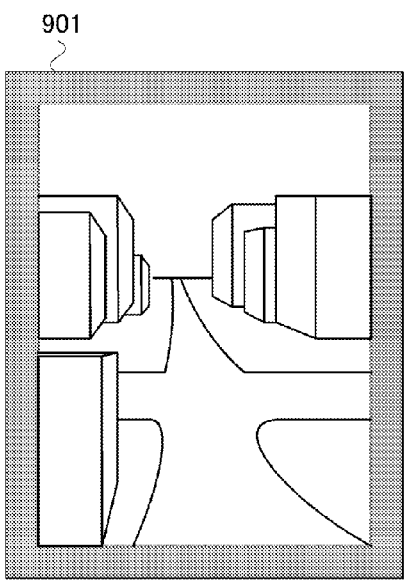

Reference will be made to the operation of a display device in this fourth embodiment by using examples of a display screen and an operation image shown in FIG. 9A through FIG. 9C. The construction and implementation form of a portable terminal having a transparent display are the same as those in FIG. 1 and FIG. 2. FIG. 9A through FIG. 9C show an example in which a map application is displayed on a transparent display portable terminal 901.

In the map application used for the explanation of this embodiment, a point of sight at the farthest end is a view point which overlooks the entire earth, which is shown in FIG. 9A. FIG. 9A also additionally shows a state in which a user operates the terminal while holding it. Hereafter, an operational mode at the time of display, as shown in FIG. 9A, is called a globe mode.

The map application displays detailed map information at a certain point or location on the earth as it is enlarged or zoomed in. A display example at this time is shown in FIG. 9B. The display example shown in FIG. 9B is a display example of the map application in an operation mode which displays an ordinary two-dimensional map, and hereafter, this operation mode is called a 2D map mode.

When the map continues to be further enlarged, the map application will carry out a display virtually showing a scenery which is in sight in cases where the user actually stands at the point. A display example at this time is shown in FIG. 9C. The display example shown in FIG. 9C is an operation mode which displays a three-dimensional map, and hereafter, this operation mode is called a 3D map mode.

At the time of using map application, the user browses map information after the user applies to a map to be displayed, display change operations such as enlargement, reduction, movement, rotation, and so on, thereby to change it into a desired map display state. It is desirable that the display change operations at this time be in an operation or manipulation system which is constructed such that they are easy to understand intuitively in each operation mode, and that they can also be carried out easily in a state where the terminal is held by hand.

Figure 10B:
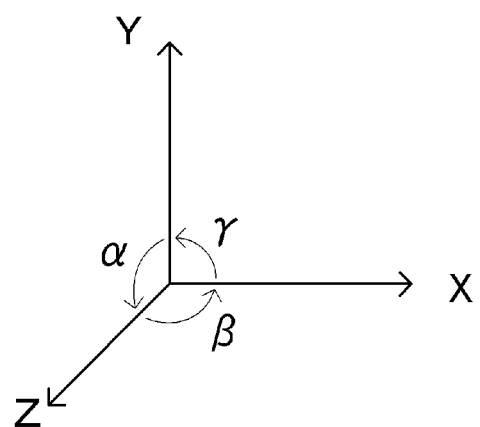
FIG. 10B shows a three-dimensional coordinate system and a direction of rotation which are used in this fourth embodiment.

A list of the display change operations to be carried out by double-sided touch operations in a globe mode is shown in a table of FIG. 10A. An operation object (i.e., an object to be operated) is a spherical body, and three-dimensional display change operations are required. A three-dimensional coordinate system and a direction of rotation, which are used in this fourth embodiment, are shown in FIG. 10B. The axes of coordinates are set to X, Y and Z. The X axis is an axis which extends in a horizontal or lateral direction from the left to the right in a plane parallel to the screen, and the Y axis is an axis which extends in a vertical or longitudinal direction from below to above in a plane parallel to the screen, and the Z axis is an axis which extends in a direction orthogonal to a plane parallel to the screen from the far side to the near side of the screen. The directions of rotation, in which the operation object is rotated with the X axis, the Y axis and the Z axis being each taken as a central axis, are denoted by $\alpha$, $\beta$, and $\gamma$, respectively. Hereinafter, the rotation about the X axis as its central axis is called an X axis rotation. In addition, the same is also applied for the rotations about the Y axis and the Z axis, respectively. The classifications of three-dimensional display change operations include rotations and movements, and in the table of FIG. 10A, the display change operations are categorized according to the operation content for each operation classification. The rotations include rotations about the X axis, the Y axis, and the Z axis, respectively. The movements include movements with respect to the direction of X, the direction of Y, and the direction of Z, respectively. That is, the three-dimensional display change operations include a total of six kinds of directions, and these are shown in a column of "operation axis and operation direction" in FIG. 10A. The directions of movement and rotation include two kinds, a positive direction and its opposite (a negative direction), respectively, and these are shown in a column of "details of operation content" in FIG. 10A. As shown in FIG. 10A, in this embodiment, a combination of a front face touch operation and a back face touch operation is assigned to each of a total of 12 kinds of directions in these three-dimensional display change operations. An operation content is decided by a finger which performs a touch operation, the direction of sliding, and the positional relationship between a finger which performs a front face touch operation and a finger which performs a back face touch operation.

Here, note that fingers for the back face touch operations shown in FIG. 10A are assumed to be an index finger and a middle finger, but may be a ring finger and a little finger lying on the back face, that is, the back face touch operations may be carried out by these fingers.

Next, how to perform the touch operations shown in FIG. 10A will be explained using this figure.

FIG. 11A is a view showing how to perform a rotation operation about the X axis. A touch position and a slide operation on the front face are denoted by a solid line arrow 1101, and a touch position and a slide operation on the back face are denoted by a broken line arrow 1102. In FIG. 11A, touch operations are carried out in which the thumb finger is made to slide upwards from below in the vicinity of the middle of the screen, while touching the front face, and the index finger is made to slide downwards from above in the same region of the back face while touching the back face. These touch operations are intuitively the same as an operation of holding and rotating the X axis by both the fingers. When detecting these touch operations, the display device carries out display control which causes the earth in the form of a display object to rotate around an axis of rotation 1103 for the X axis rotation in an direction opposite to α. In addition, in cases where a front face touch operation is downward and a back face touch operation is upward, the display device carries out display control to cause the earth in the form of the display object to rotate in the a direction.

FIG. 11B is a view showing how to perform a rotation operation about the Y axis. In FIG. 11B, a rightward operation to slide the thumb finger from the left to the right is carried out as a front face touch operation, and a leftward operation to slide the index finger from the right to the left in the same region is carried out as a back face touch operation. When detecting these touch operations, the display device carries out display control to cause the earth in the form of the display object to rotate around an axis of rotation 1104 for the Y axis rotation in a β direction. On the other hand, in cases where a front face touch operation is leftward and a back face touch operation is rightward, the display device carries out display control to cause the earth in the form of the display object to rotate in an direction opposite to β.

In FIG. 11A and FIG. 11B, the vicinity of the middle of the screen is made as a touch area, but the position of the touch area is not limited to this. For example, a screen edge may also be made as a touch area. Without regard to the position of the touch area, the display device carries out display control to cause the earth in the form of the display object to rotate about an axis passing through the center of the earth as an axis of rotation.

In addition, in FIG. 11A and FIG. 11B, display control in the case where the touch operations to slide the fingers in the vertical (upper and lower) direction or in the lateral (horizontal) direction are carried out has been explained, but the sliding directions of the touch operations for rotating the display object are not limited to these, but may be oblique directions, for example. In that case, the display device decomposes the sliding direction of each touch operation into the Y axis direction and the X axis direction, and carries out display control which performs an X axis rotation and a Y axis rotation at the same time. With this, a rotation operation of the display object is carried out in correspondence to arbitrary sliding directions.

Figure 11D:
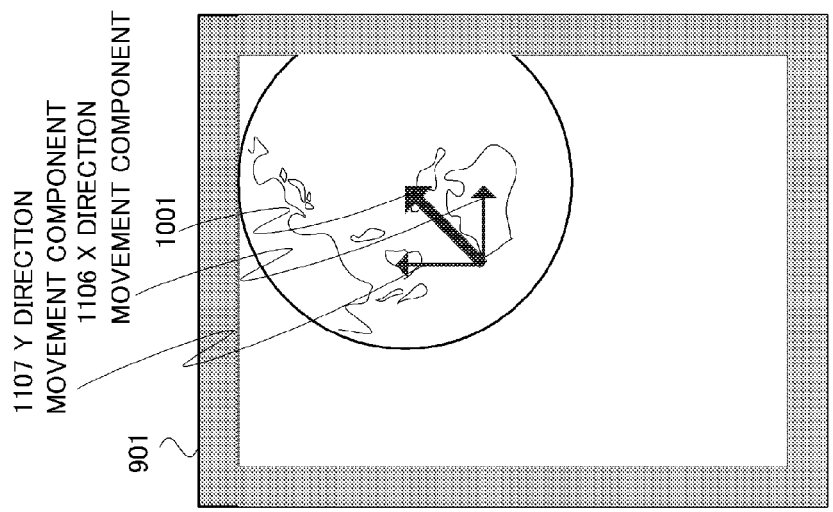
Figure 11C:
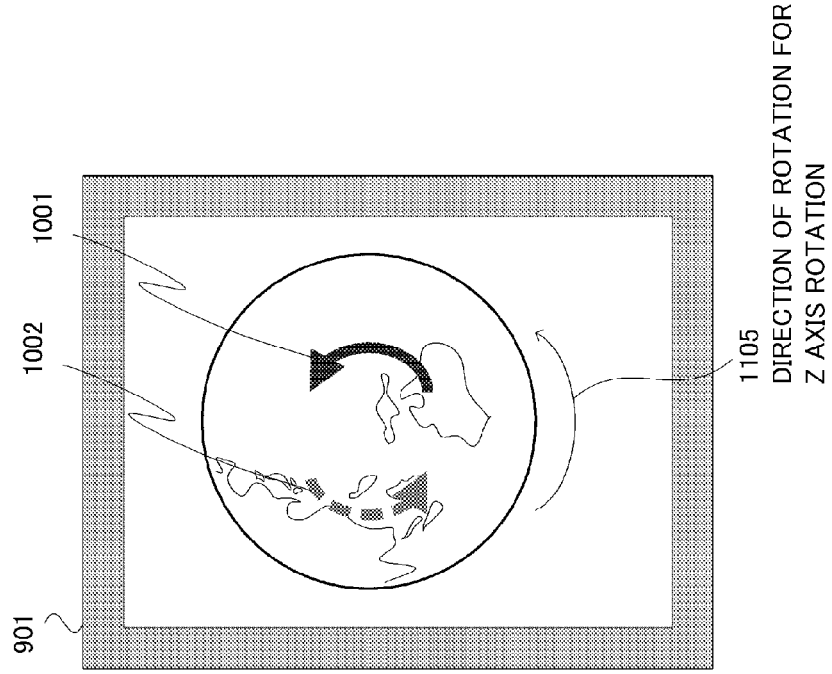

FIG. 11C is a view showing how to perform a rotation operation about the Z axis. In FIG. 11C, a slide operation in a counter clockwise direction is carried out as a front face touch operation, and a slide operation in the counter clockwise direction is carried out, as a back face touch operation, in a region away from a region of the front face touch operation. When detecting these touch operations, the display device carries out display control to cause the earth in the form of the display object to rotate around the center of the earth as a center of rotation in a γ direction, as shown in a direction of rotation 1105 for the Z axis rotation. On the other hand, in cases where a front face touch operation is a slide operation in a clockwise direction and a back face touch operation is a slide operation in the clockwise direction in a region away from a region of the front face touch operation, the display device carries out display control to cause the earth in the form of the display object to rotate in an direction opposite to γ.

Now, reference will be made to an operation which causes a translational movement of the earth in the form of the display object on the screen. In this embodiment, this display change operation is carried out by a single-sided touch operation. FIG. 11D is a view showing a display change operation in cases where a front face touch operation to slide a finger in an obliquely right upward direction is carried out. By this touch operation, a movement operation toward a plus (+) side in the X direction shown in FIG. 10A and a movement operation toward a plus (+) side in the Y direction are carried out at the same time, whereby a display change operation is carried out in which the earth in the form of the display object is caused to perform a translational movement in accordance with a slide operation of the finger, as shown in FIG. 11D. Here, note that an example has been shown in which a translational movement operation of the display object is carried out by a front face touch operation, but such a translational movement operation of the display object can be carried out by a back face touch operation.

Next, a movement of the display object in the Z direction will be explained. The movement of the display object in the Z direction means that the display object comes near to or away from the user, and a corresponding display change operation becomes enlargement or reduction. In this embodiment, by means of an operation for the user to touch a desired location of the display object two consecutive times from the back face, a movement operation is carried out in which that location of the display object is caused to move from the back side toward the front side, so that display control to enlarge that location is carried out. On the other hand, by means of an operation for the user to touch a desired location of the display object two consecutive times from the front face, a movement operation is carried out in which that location of the display object is caused to move from the front side toward the back side, so that display control to reduce that location is carried out.

Although a display change operation for enlargement and/or reduction is possible by an operation of making two consecutive touches on the front face or the back face, an enlargement ratio and/or a reduction ratio (an amount of movement of the display object in the Z direction) by one touch operation is constant, and fine adjustment thereof is impossible. However, fine adjustment of the enlargement ratio and/or the reduction ratio can be made by means of a touch operation of touching two points in the display object at the same time, and adjusting the distance or length between the two points to an arbitrary size. In a state where the display device is held by a single hand, however, this touch operation can not be performed only on the front face. In cases where this touch operation is carried out on the back face, it is possible to perform a touch operation to adjust the distance or length between specified two points to an arbitrary size, for example, by touching the two points at the same time with the use of the index finger and the middle finger, but it can not necessarily be said that such a operation is easy.

A display change operation for enlargement and/or reduction using a slide operation will be explained, by the use of FIG. 12A and FIG. 12B. The display is changed from FIG. 12A into FIG. 12B by means of a scale enlargement display change operation, and the display is changed from FIG. 12B into FIG. 12A by means of a scale reduction display change operation. A touch operation for scale enlargement is an operation which fixes or stays touching a front face touch location 1201 in FIG. 12A with the thumb, and at the same time causes the index finger and the middle finger to slide downward on the back face, as shown in aback touch slide operation 1202 of the two fingers in FIG. 12A. By such a touch operation, display control is carried out in such a manner that the vicinity of the location on the map touched with the thumb can be enlarged, while keeping the display of the touched location within the screen, as a result of which a display as shown in FIG. 12B can be obtained. On the other hand, a touch operation for scale reduction is an operation which fixes or stays touching the front face touch location 1201 in FIG. 12A with the thumb, and at the same time causes the index finger and the middle finger to slide upward on the back face, as shown in the back touch slide operation 1202 of the two fingers in FIG. 12B. By such a touch operation, display control is carried out in such a manner that the vicinity of the location on the map touched with the thumb can be reduced, while keeping the display of the touched location within the screen, as a result of which a display as shown in FIG. 12A can be obtained. According to the above-mentioned touch operations, it is possible to carry out scale enlargement and/or scale reduction display change operation, i.e., a display change operation due to a movement in the Z direction.

A slide operation with the two fingers is a special slide operation, and can be said to be an operation of reminding an operation of making the user rotate a wheel of a mouse. Here, note that in this embodiment, a touch operation in which the thumb of one hand is fixed or stayed while touching one face of the screen and the two fingers thereof are made to slide on the other face is set as a touch operation corresponding to the scale enlargement and/or scale reduction display change operation. This is because by assigning a special touch operation in the form of a slide operation by the two fingers to the scale enlargement and/or scale reduction display change operation, it becomes easy for the user to distinguish this display change operation from touch operations for other display change operations, thus enabling the user to do an intuitive operation. As will be described later by using FIG. 13 and FIGS. 14A through 14D, a touch operation in which the thumb of one hand is fixed or stayed while touching one face of the screen and one other finger thereof is made to slide on the other face is assigned to a display change operation for rotation.

Next, display change operations by double-sided touch operations in a 2D map mode will be explained. An operation system for touch operations in the 2D map mode is taken as the same operation system as in the globe mode shown in FIG. 10A.

However, in the 2D map mode, a touch operation corresponding to a rotation operation of the display object shown in FIG. 10A becomes a display result equivalent to that by a movement operation of the display object. For example, a display result in the case of carrying out a display change operation of rotating the display object around the X axis as a center of rotation in an direction opposite to a becomes equivalent to a display result in the case of carrying out a display change operation of moving the display object to the plus (+) side in the Y direction. That is, in cases where a touch operation corresponding to a rotation operation of the display object is carried out, too, or in cases where a touch operation corresponding to a movement operation of the display object is carried out, too, a display change operation for movement is similarly carried out with respect to the display object. Accordingly, in the following explanation of the 2D map mode, it is assumed that both an amount of rotation (rotational speed) of the display object due to a rotation operation and an amount of movement (moving speed) of the display object due to a movement operation mean an amount of display transition (display transition speed) equivalent to each other.

In the 2D map mode, it is possible to carry out a more effective movement operation by applying a touch operation corresponding to a rotation operation of the display object shown in FIG. 10A. Such an example will be explained by using a table in FIG. 13 and display screen examples in FIG. 14A through FIG. 14D.

In FIG. 10A, in cases where display change operations for the X axis rotation and the Y axis rotation are carried out with respect to a display object, slide operations are carried out in opposite directions on the front face and the back face, respectively, but in these operations, an applied operation will be considered in which one of fingers is fixed touching the front or back face. In this case, the surface on which a slide operation is carried out is only one of the front and back faces, and hence, if display change operations are carried out in which the amount of rotation (the amount of movement) of the display object becomes smaller and the rotational speed (the speed of movement) becomes slower, in comparison with the case where slide operations are carried out on both of the faces, they will be intuitive, clear and easy to understand. That is, in the touch operations corresponding to the rotation operation of the display object in FIG. 10A, in cases where one finger is fixed touching one of the front and back faces without carrying out either one of a front face slide operation and a back face slide operation, the rotational speed (the speed of movement) is made slower, or the amount of rotation (the amount of movement) is made smaller, than the case where slide operations are carried out on both of the front and back faces. As a result of this, it becomes possible to perform a fine adjustment operation in the display change operation for movement.

On the other hand, it may sometimes be desired that the display object be caused to rotate or move at higher speed. Accordingly, in the touch operations corresponding to the rotation operation of the display object in FIG. 10A, an applied operation is considered in which a back face slide operation is performed not by one finger but instead by all four fingers on the back face. In this case, if display change operations are carried out in which the amount of rotation (the amount of movement) of the display object becomes larger (increased) and the rotational speed (the speed of movement) becomes higher (accelerated), in comparison with the case where a back face slide operation is carried out by means of one finger, they will be intuitive, clear and easy to understand.

FIG. 13 shows the relation between touch operations corresponding to display change operations for rotation and the rotational speed (speed of movement, display transition speed or rate). Examples of the screen at the time of carrying out the touch operations shown in FIG. 13 are shown in FIG. 14A through FIG. 14D.

Figures 14A, 14B:
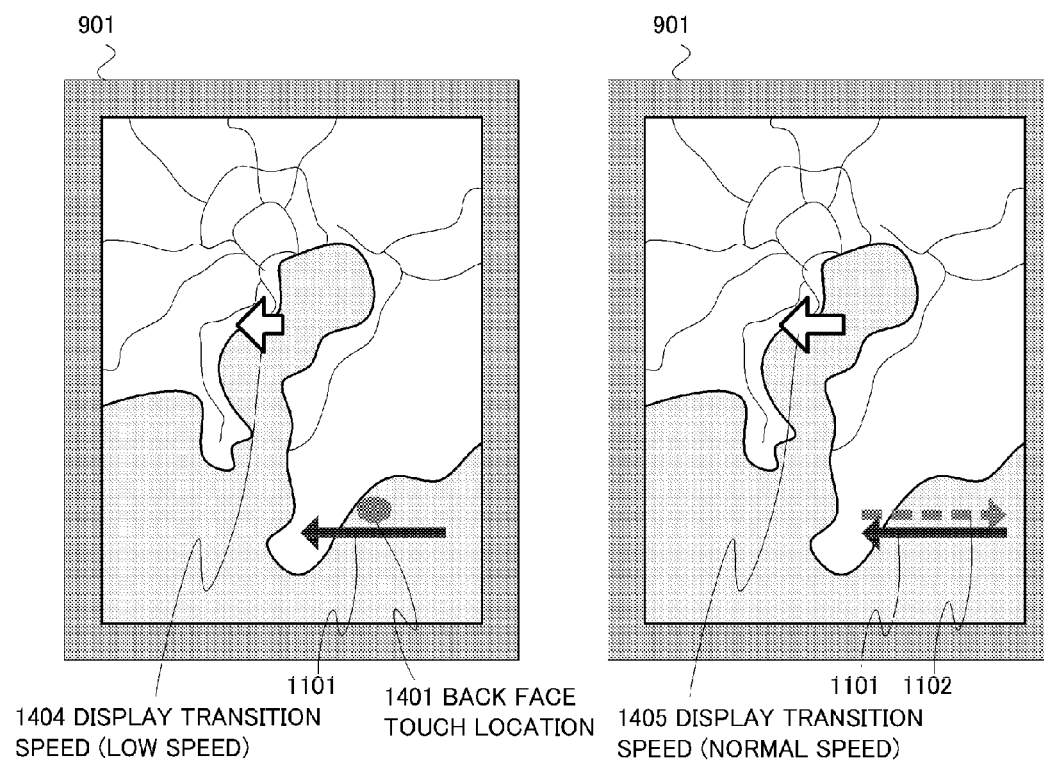
FIGS. 14A through 14D are conceptual diagrams showing individual movement operations in the 2D map mode, respectively, in the fourth embodiment.

In FIG. 14A, as a front face touch operation, a thumb is made to slide in a leftward direction, as shown in a front touch slide operation 1101, and as aback face touch operation, a back face touch location 1401 is fixed while being touched by a finger. The display transition speed in the case of such touch operations being carried out becomes low speed, as schematically indicated by an arrow 1404. Here, it is assumed that the arrow indicating the display transition speed means that the longer the arrow, the faster is the speed. Here, note that in cases where touch operations are carried out in which as a front face touch operation, the front face is fixed while being touched, and as a back face touch operation, a slide operation in a rightward direction is carried out, too, the display transits or changes at the same speed as in the case where the touch operation in FIG. 14A is carried out.

In FIG. 14B, fingers are made to slide in opposite directions with respect to each other on the front face and the back face, respectively, as shown in the front touch slide operation 1101 and a back touch slide operation 1102. The display transition speed in the case of such touch operations being carried out becomes normal speed, as schematically indicated by an arrow 1405.

Figures 14C, 14D:
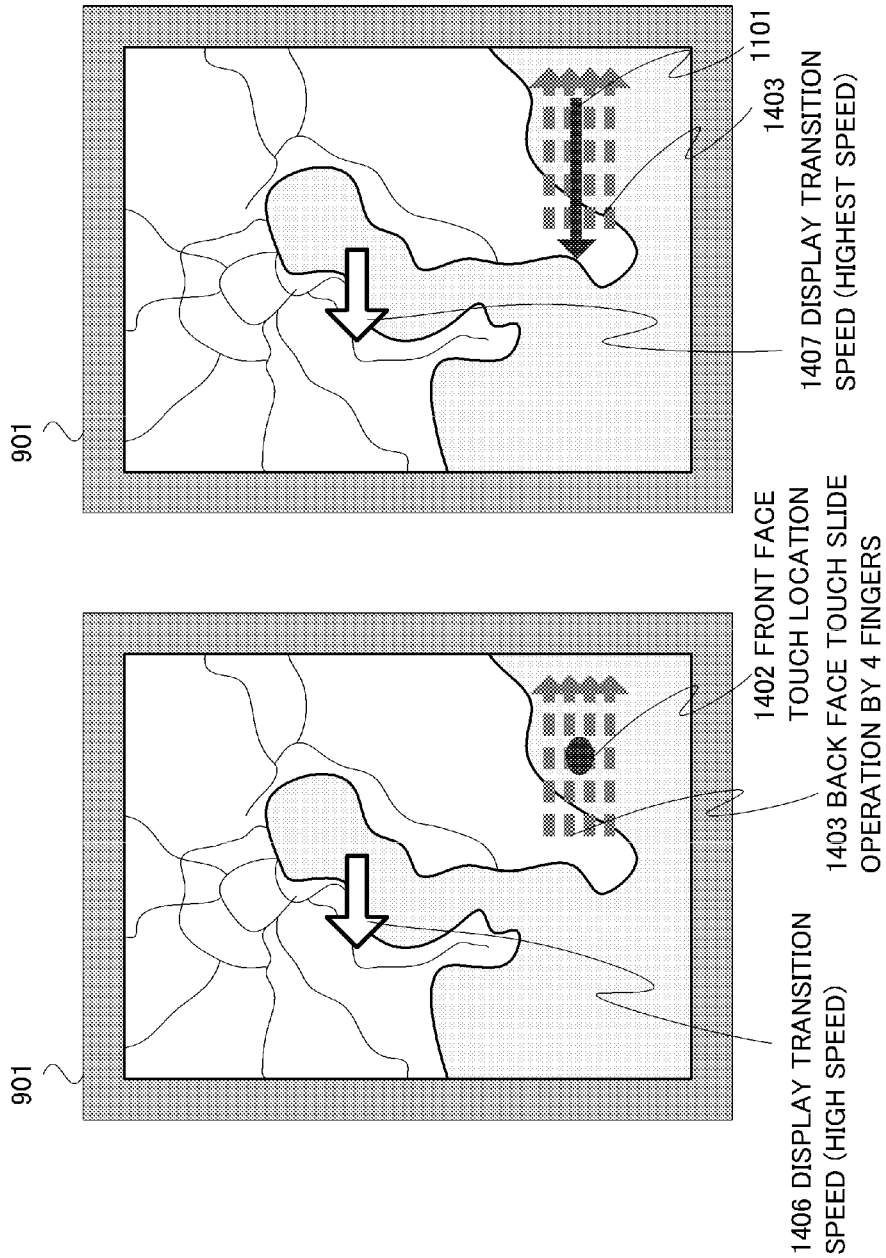

In FIG. 14C, as a front face touch operation, a front face touch location 1402 is fixed while being touched by a thumb, and as a back face touch operation, a back face slide operation is carried out with four fingers, as shown in a back touch slide operation 1403 of the four fingers. The display transition speed in the case of such touch operations being carried out becomes high speed, as schematically indicated by an arrow 1406.

In FIG. 14D, a thumb is made to slide in the leftward direction, as shown in the front touch slide operation 1101, and as a back face touch operation, a back face slide operation is carried out with four fingers, as shown in the back touch slide operation 1403 of the four fingers. Thus, the display transition speed in cases where touch operations, in which the front face slide operation and the back face slide operation of the four fingers are performed together, are carried out becomes the highest, as schematically indicated by an arrow 1407.

According to the above, by means of intuitive operations, the speed of movement (display transition speed) can be changed in an easy manner. Here, note that in FIGS. 14A through 14D, examples of movement in the leftward and rightward (horizontal) directions are shown, but touch operations for changing the speed of movement explained in this embodiment can be applied not only to the movement (display transition) in the leftward and rightward directions but also to movements (display transition) in arbitrary directions such as vertical and horizontal directions.

Next, display change operations by double-sided touch operations in a 3D map mode will be explained. FIG. 15 is a table showing a list of display change operations in the 3D map mode. In the display change operations in the 3D map mode, as operation classifications, there are a user viewpoint movement, a user position movement, and enlargement and/or reduction.

Display change operations and display contents of the user view point movement will be explained by using FIG. 16A through FIG. 16E. Here, as a simple example for the purpose of explanation, there will be described a case in which an object of a cubic shape lies ahead of the position (view point) of a user in a virtual three-dimensional space.

Figure 16B:
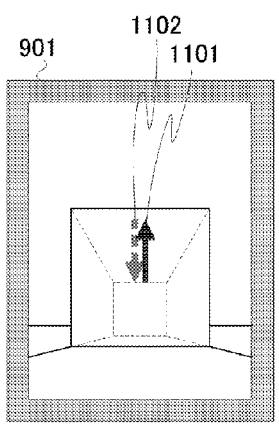
FIGS. 16A through 16E are conceptual diagrams showing a user's view point movement in the 3D map mode in the fourth embodiment.
Figure 16D:
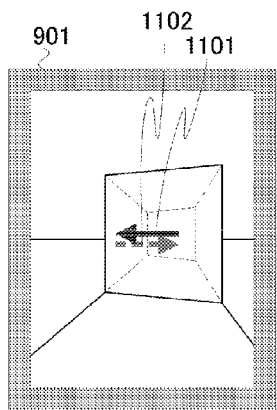
Figure 16A:
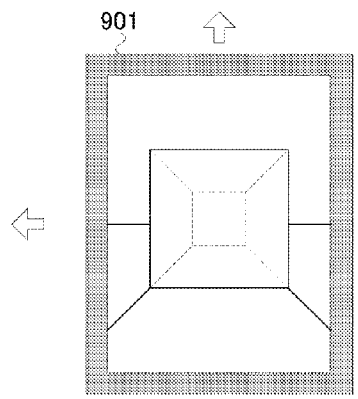

FIG. 16A represents an initial state which becomes a starting point, and in which a cubic body is seen at the front from the user's view point in the virtual three-dimensional space.

In this embodiment, as touch operations for rotational transfer or movement to direct the user's view point upwards, there are used touch operations which include in combination an upwardly sliding front face touch operation and a downwardly sliding back face touch operation. In FIG. 16B, there is shown a display content in a state where these touch operations and a rotational transfer or movement to direct the user's view point upwards with respect to the initial state have been carried out.

Figure 16E:
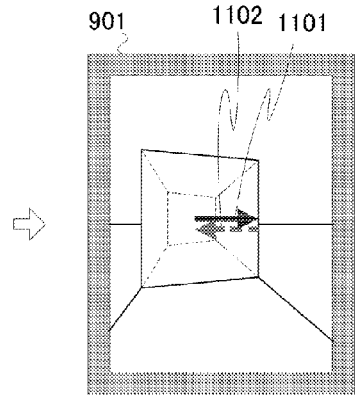
Figure 16C:
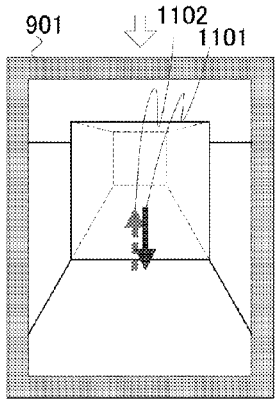

Touch operations for rotational transfer or movement to direct the user's view point downwards are opposite or reverse to the touch operations for rotational transfer to direct the user's view point upwards. In FIG. 16C, there is shown a display content in a state where these touch operations and a rotational transfer or movement to direct the user's view point downwards with respect to the initial state have been carried out.

As touch operations for rotational transfer or movement to direct the user's view point to the right, in this embodiment, there are used touch operations which include in combination a leftward sliding front face touch operation and a rightward sliding back face touch operation. In FIG. 16D, there is shown a display content in a state where these touch operations and a rotational transfer or movement to direct the user's view point to the right with respect to the initial state have been carried out.

Touch operations for rotational transfer or movement to direct the user's view point to the left are opposite or reverse to the touch operations for rotational transfer to direct the user's view point to the right. In FIG. 16E, there is shown a display content in a state where these touch operations and a rotational transfer or movement to direct the user's view point to the left with respect to the initial state have been carried out.

An amount of slide in each touch operation and an amount of movement of the user's view point are in correlation with each other. That is, when the amount of slide in each touch operation is large, the amount of movement of the user's view point also becomes large, whereas when the amount of slide in each touch operation is small, the amount of movement of the user's view point also becomes small. In addition, the touch operations for the rotational transfer of the user's view point are not limited to slide operations in the up and down (vertical) directions or slide operations in the left and right (horizontal) directions, which are exemplified above, but the rotational transfer of the user's view point can be carried out by means of slide operations in arbitrary directions. In this embodiment, with respect to a slide operation in an arbitrary direction, the direction of sliding thereof is decomposed into the X direction and the Y direction, and a rotation operation of the user' view point corresponding to each of a slide operation in the X direction and a slide operation in the Y direction is carried out, whereby the rotational transfer of the user's view point corresponding to the slide operation in the arbitrary direction can be made. Here, note that in the examples of FIG. 16A through FIG. 16E, a state is exemplified in which touch operations are carried out in the vicinity of the middle of the screen, but the rotational transfer of the user's view point does not depend upon the position in the screen in which a touch operation is carried out. That is, as long as the contents of touch operations are equivalent to each other, an equivalent rotational transfer of the user's view point is made, even if such operations are carried out in any position within the screen.

The display change operations shown in FIG. 16A through FIG. 16E are operations in which the display object is subjected to the X axis rotation or the Y axis rotation around the position of the user's view point as a center of rotation. According to this embodiment, it becomes possible for the user to input to the display device an instruction for carrying out such a complicated rotation operation with respect to the display object by means of intuitive touch operations as referred to above.

Next, display change operations and display contents for movement of the user position will be explained by using FIG. 17A through FIG. 17E. Similar to FIGS. 16A through 16E, there will be described a case in which an object of a cubic shape lies ahead of the position (view point) of a user in a virtual three-dimensional space.

Figure 17B:
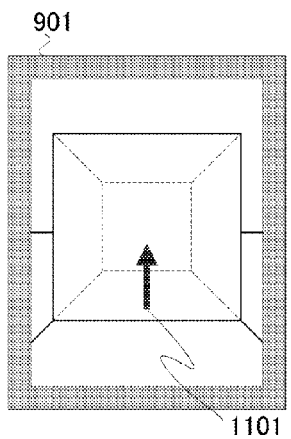
FIG. 17A through 17E are conceptual diagrams showing a user's position movement in the 3D map mode in the fourth embodiment.
Figure 17D:
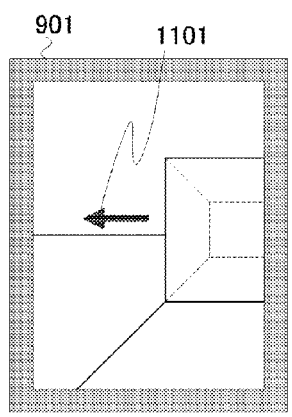
Figure 17A:
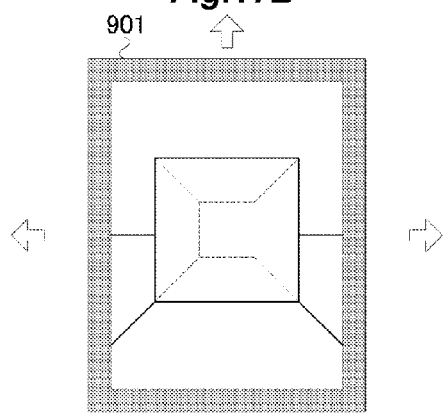

FIG. 17A represents an initial state which becomes a starting point, and in which a cubic body is seen at the front from the user's view point in the virtual three-dimensional space.

Figure 17E:
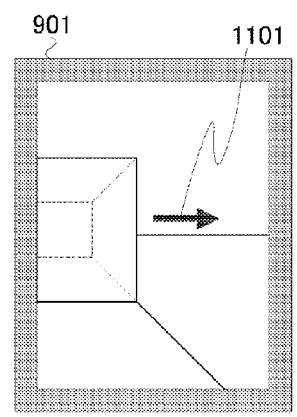
Figure 17C:
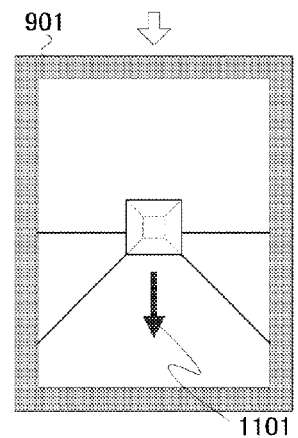

As touch operations for moving the user position in front and back directions (near and far directions), in this embodiment, there is used an upwardly or downwardly sliding front face touch operation. FIG. 17B and FIG. 17C show display contents in cases where these touch operations and a movement operation to move the user position in the front and back directions with respect to the initial state have been carried out.

The touch operations for moving the user position in left and right directions are assumed to be a leftward or rightward sliding front face touch operation. FIG. 17D and FIG. 17E show display contents in cases where these touch operations and a movement operation to move the user position in the left and right directions with respect to the initial state have been carried out.

In this manner, according to this embodiment, the user can carry out display change operations for user position movement by means of simple and intuitive touch operations. Here, note that in FIG. 17A through FIG. 17E, there are shown examples in which the front face touch operations are carried out for movement of the user position, but the touch operations for the user position movement are not limited to these, and similar user position movements may be performed by means of back face touch operations.

Here, note that touch operations for enlargement/reduction display change operations in the 3D map mode are similar to what has been explained using FIGS. 12A and 12B, and hence, the explanation thereof is omitted.

Figure 18:
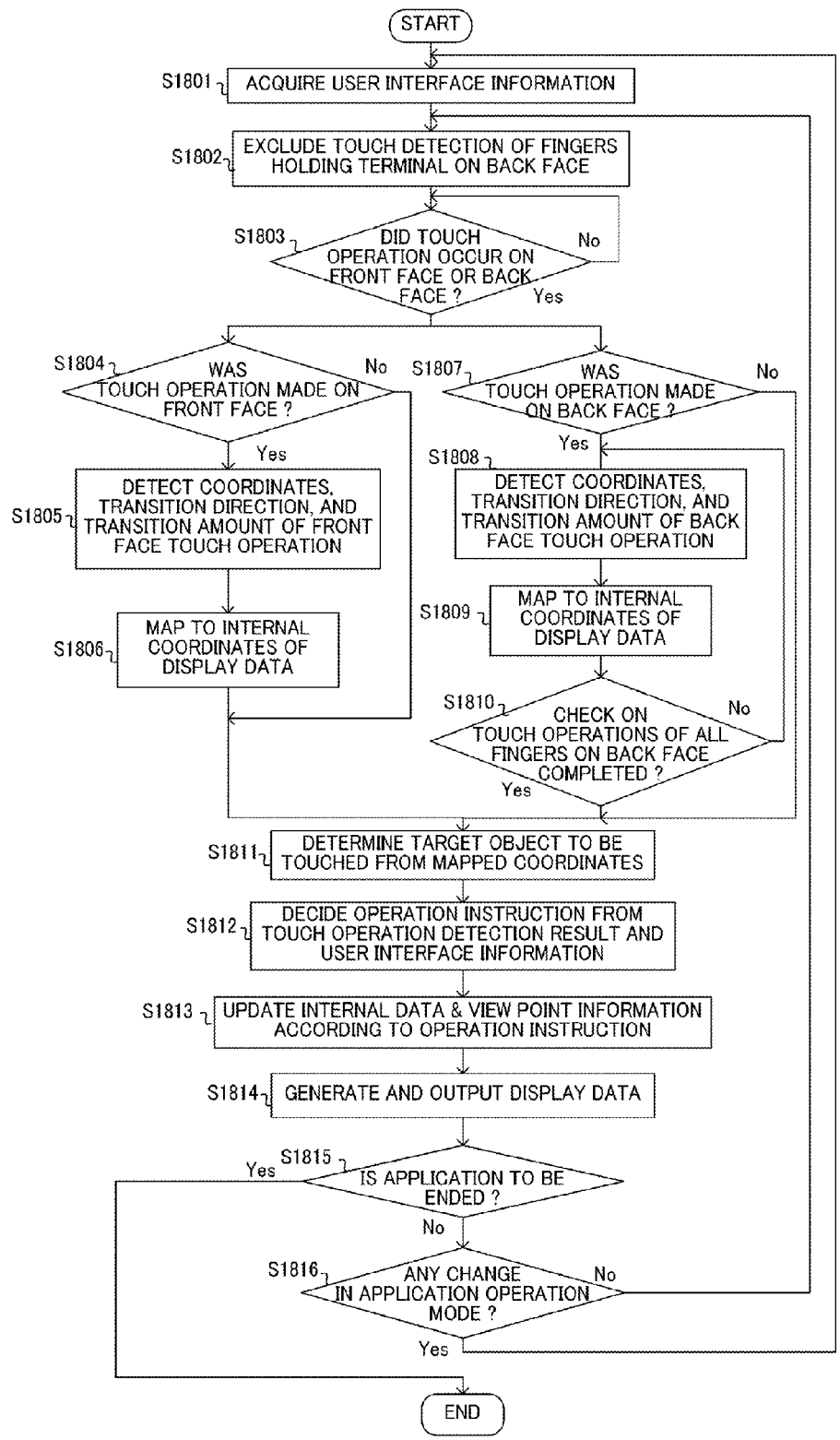
FIG. 18 is a flow chart showing processing for the user interface display and the touch operation in the fourth embodiment.

Now, reference will be made to a flow and a display action for the above-mentioned touch operation input processing by using a flow chart in FIG. 18, and the construction view in FIG. 1. First, in step S1801, the CPU 106 acquires user interface information of a program which has been held in the RAM 107. The user interface information is information for configuring a user interface through which a user inputs commands to the display device by means of touch operations. In this embodiment, such information includes mode information on a globe mode, a 2D map mode and a 3D map mode, or information on the correlation relation between display change operations and touch operations according to each mode (i.e., information shown by the tables in FIG. 10A, FIG. 13, and FIG. 15).

Then, in step S1802, processing is carried out for excluding the result of touch detection of fingers which are in contact with the back face of the terminal so as to hold the terminal. This processing is carried out as follows. That is, with respect to detection results from the back touch operation input unit 115, the UI control unit 113 masks a detection result indicating that a contact state continues for a predetermined period of time or more, or masks that portion of a detection result which matches a pattern appearing when the terminal is held by hand.

In step S1803, the UI control unit 113 determines whether a touch operation occurs on the front face or on the back face. This processing is carried out by determining whether a touch operation other than those contained in the detection results which have been masked in step S1802 is contained in the detection results received from the back touch operation input unit 115 and the front touch operation input unit 116. Then, the control process branches to step S1804 and step S1807, respectively.

In step S1804, the UI control unit 113 determines, based on the detection results from the front touch operation input unit 116, whether a front face touch operation has been made. When a front face touch operation has been made, the control process goes to step S1805, whereas when otherwise, the control process goes to step S1811. In step S1805, the UI control unit 113 acquires the coordinates of a location at which the front face touch operation has occurred, the direction of displacement (the direction of slide), and an amount of displacement (an amount of slide). The UI control unit 113 carries out this processing by calculating differences between the current detection results and the last detection results. The UI control unit 113 sends out the calculation results to the CPU 106 through the system bus 108.

Thereafter, in step S1806, the CPU 106 converts (maps) the front face touch operation detection results into coordinates (hereinafter internal coordinates) in a three-dimensional space where the display object as a three-dimensional figure or graphic is defined, or into information of direction. The display object drawn as a two-dimensional figure on the screen is processed as three-dimensional figure (graphic) data (also referred to as internal data) inside the display device. The CPU 106 converts the information on the three-dimensional figure in the three-dimensional space into a two-dimensional image based on information representing the three-dimensional shape of the display object, and information of an observer in the three-dimensional space (e.g., the coordinates of the view point, the direction of the sight line, the angle of visibility, etc). On the other hand, the CPU 106 converts (maps) touch operation information within the two-dimensional plane on touch operations carried out on the two-dimensional screen into coordinates in the internal three-dimensional space or directional information.

In step S1807, the UI control unit 113 determines, based on the detection results from the back touch operation input unit 115, whether a back face touch operation has been made. When a back face touch operation has been made, the control process goes to step S1808, whereas when otherwise, the control process goes to step S1811. In step S1808, the UI control unit 113 acquires the coordinates of a location at which the back face touch operation has occurred, the direction of displacement (the direction of slide), and an amount of displacement (an amount of slide). The UI control unit 113 carries out this processing by calculating differences between the current detection results and the last detection results. The UI control unit 113 sends out the calculation results to the CPU 106 through the system bus 108.

Thereafter, in step S1809, the CPU 106 converts (maps) the back face touch operation detection results into coordinates in a three-dimensional space where the display object as a three-dimensional figure or graphic is defined, or into data of direction. This processing is the same as the processing carried out in step S1806.

Subsequently, in step S1810, the UI control unit 113 determines whether the above-mentioned processings in steps S1808 and S1809 have been completed for all the fingers carrying out effective back face touch operations (back face touch operations which have not been excluded in step S1802). When not yet completed, the control process returns to step S1808, so that the processings in steps S1808 and S1809 are repeated until completed for all the fingers carrying out effective touch operations on the back face. On the other hand, when completed, the control process goes to step S1811.

In step S1811, the CPU 106 determines an object which has been made a target to be operated by touch operations in the three-dimensional space, from the information of the touch operations which has been mapped into the three-dimensional space in which the three-dimensional information of the display object has been defined. In addition, the CPU 106 also determines whether a region (coordinates) where the touch operations have been carried out lies on the object or in the other regions.

Then, in step S1812, the CPU 106 decides an operation instruction for display change operations, based on the touch operation detection results acquired in step S1806 and in step S1809, and the user interface information acquired in step S1801. Here, the operation instruction is a group of information which is necessary for the display change operations, such as an operation classification such as rotation, transfer (movement), etc., the coordinates of the target object, the direction of transition (movement) of the view point coordinates, an amount of transition (an amount of movement), etc. The CPU 106 decides, based on the touch operation detection results, the display change operations corresponding to the detected touch operations from the table in FIG. 10A or FIG. 15.

In step S1813, the CPU 106 updates the internal data and the view point information according to the operation instruction thus decided. In step S1814, the display data generation unit 109 generates display data from the internal data and the view point information thus updated, and sends out the generated display data to the transparency control unit 111 and the light emitting layer control unit 112. As a result of this, the two-dimensional image of the display object, on which the display change operations has been carried out according to the touch operations, is displayed on the transparent display 101 which is capable of double-sided touch operation.

Thereafter, the control process goes to step S1815, where the CPU 106 determines whether the application is to be ended, and when it is Yes, the CPU 106 ends the application. On the other hand, when it is No, the control process goes to step S1816. In step S1816, the CPU 106 determines whether there is any change in the operation mode of the application, and when it is Yes, a return to step S1801 is carried out, so that the CPU 106 acquires user interface information again, whereas when it is No, a return to step S1802 is carried out, so that the CPU 106 repeats a series of processings from the touch operation detection step to the display step.

According to the above-mentioned flow, in a display device which has a transparent display and to which an instruction for display change operations can be inputted by touch operations, operability in the case of using an application such as a map application, in which complicated touch operations are required, can be improved. That is, by combining front face touch operations and back face touch operations with each other in an appropriate manner, it is possible to construct a touch operation system for a wide variety of kinds of display change operations such as transfer (movement), rotation, enlargement and/or reduction, view point change, and speed change in display change (display transition), in such a manner that touch operations are intuitive, simple, and easy to mutually distinguish from one another.

(Fifth Embodiment)

Figure 19:
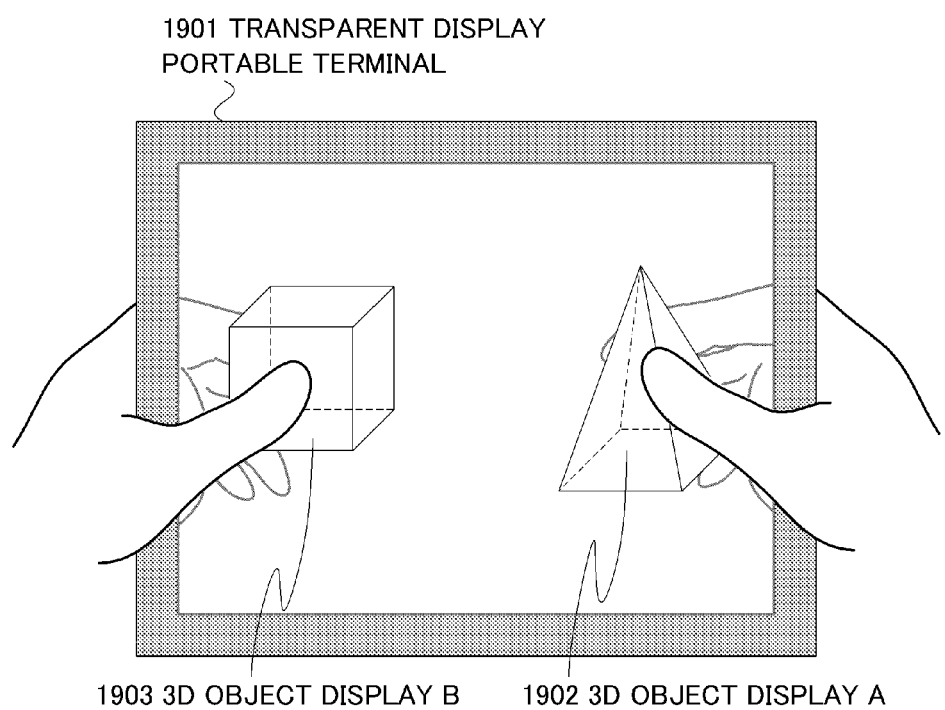
FIG. 19 is a conceptual diagram showing a user interface display and touch operation in a fifth embodiment.

Reference will be made to the operation of a display device in this fifth embodiment by using an example of a display screen and an operation image shown in FIG. 19. The construction and implementation form of a portable terminal having a transparent display are the same as those in FIG. 1 and FIG. 2. FIG. 19 shows an example in which 3D objects are displayed on a transparent display portable terminal 1901. In the display example of FIG. 19, there are displayed two objects, i.e., a square conical shaped 3D object display A1902 and a cubic shaped 3D object display B1903. In FIG. 19, there is also shown a state in which a user performs touch operations on the above-mentioned two 3D objects, from opposite sides, i.e., a front face and a back face, while holding the transparent display terminal 1901.

Figure 20:
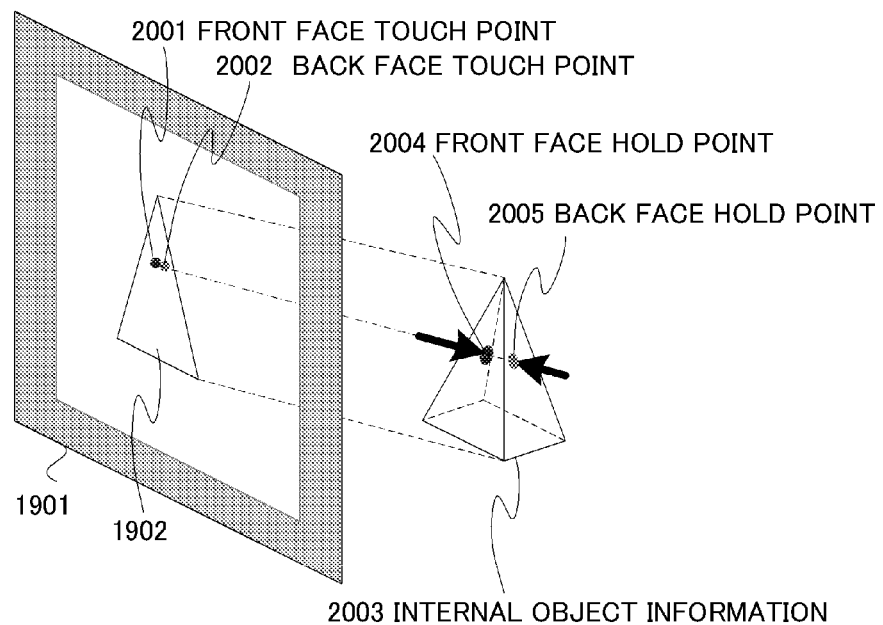
FIG. 20 is a conceptual diagram showing touch operations to grasp a 3D object in the fifth embodiment.

Performing touch operations on the screen with a 3D object displayed thereon, from the opposite sides thereof, the front face and the back face, intuitively evokes the user to virtually hold the 3D object in the form of a target to be operated with fingers from opposite sides thereof. FIG. 20 is a view explaining the concept of touch operations constructed so that they can be carried out with such a feeling as to grasp a 3D object with fingers. In the touch operations shown in FIG. 20, the user touches a front face touch point 2001 with the thumb of one hand from the front face, and at the same time, touches a back face touch point 2002 from the back face with either of the four fingers (e.g., the index finger) at the back side.

In FIG. 20, internal object information 2003 is information on the three-dimensional shape of the 3D object (also referred to as internal data) corresponding to the 3D object display A1902 in FIG. 19. In actuality, the internal object information 2003 exists only as data inside the terminal, but does not exist as physical and three-dimensional actual existence in the outside of the terminal. However, in FIG. 20, the internal object information 2003 is illustrated in order to explain the concept of the correlation relation of the 3D object displayed as a two-dimensional image, and the three-dimensional shape corresponding to the 3D object. A front face hold or touch point 2004 in the three-dimensional shape of the 3D object corresponds to the front face touch point 2001. That is, the front face touch point 2004 is one which is obtained by converting (mapping) the position information (coordinates) of the front face hold point 2004 on the screen in the form of a two-dimensional plane into position information (coordinates) in the 3D object inside the three-dimensional space. In addition, a back face hold point 2005 corresponds to the back face touch point 2002. When the displayed 3D object is touched from the front face and the back face, the 3D object is selected as an operation target object (i.e., an object to be operated). Along with this, display change operations are carried out which virtually grasp and hold the 3D object as a three-dimensional shape at the above-mentioned hold points, in the three-dimensional space in which the internal data has been defined.

In cases where a plurality of 3D objects are displayed in the screen, it is desirable that the user be able to carry out display change operations for transfer (movement) and rotation with respect to each of the 3D objects independently from one another, and moreover, be able to carry out display change operations for transfer (movement) and rotation with respect to the entire display images (the entire three-dimensional space in which the 3D objects exist). Furthermore, it is also desirable that the user be able to carry out operations of the view point of observation, the direction of sight line, and the angle of visibility. In order to make instructions for operations of three-dimensional movement and rotation, it is necessary to instruct operations in three directions, respectively, so the operations become complicated. For that reason, with the touch operation system for inputting instructions for these display change operations to the display device, it is desirable that touch operations be easy to understand intuitively, and in addition, be able to be easily carried out in the state of the user holding the terminal.

An example of the correlation relation between display change operations and touch operations with respect to 3D objects is shown in FIG. 21. The axes of coordinates (X, Y, Z) and the meaning of symbols for the directions of rotation ($\alpha$, $\beta$, $\gamma$) are the same as in FIG. 10B. The operation classifications and the operations with respect to the objects are the same as the contents explained by using FIG. 10A in the fourth embodiment. FIG. 21 shows a touch operation system in an operation mode in which display change operations are carried out for each object, and in this operation mode, display change operations corresponding to touch operations are carried out only for a target object selected as an operation target (an object to be operated). This operation mode is different from an operation mode, to be described later, in which display change operations (operations of changing the position of view point) with respect to the entire display images are carried out. In this embodiment, a determination as to which operation mode is adopted for display change operations is made according to whether or not a touch location is on an object. The column of "touch location" in FIG. 21 shows touch operation conditions for the operation mode in which display change operations are carried out for each object. Here, in cases where there exist a plurality of 3D objects in the screen, it is possible for the user to select one of them as a 3D object for a display change operation target according to a touch location.

Here, note that in FIG. 21, fingers for back face touch operations are assumed to be an index finger and a middle finger, but may be a ring finger and a little finger lying on the back face, that is, the back face touch operations may be carried out by these fingers.

Next, examples of display change operations by touch operations shown in FIG. 21 will be explained by using the following figures. FIG. 22A and FIG. 22B show display examples in the case of carrying out display change operations to cause rotational movements of a 3D object around axes of rotation existing in an XY plane. In the examples of FIG. 22A and FIG. 22B, both rotation about an X axis and rotation about a Y axis are carried out. FIG. 22A shows a display state before rotation, and FIG. 22B shows a display state after rotation. FIG. 22A shows an example in which the user carries out a slide operation to slide the thumb in an obliquely upper left direction, as shown in a front touch slide operation 2201, and at the same time carries out a slide operation to slide the index finger in an obliquely lower right direction, as shown in a back touch slide operation 2202.

First, touch locations at the time of start of touch operations, which correspond to a rotational transfer or movement, exist on the square conical 3D object 1902, and hence, this 3D object 1902 is selected as a target object for display change operations. Then, as a front face touch location and a back face touch location are caused to move gradually by means of slide touch operations on the front face and the back face, respectively, rotation about the X axis and rotation about the Y axis take place at the same time, thus finally providing a display result, as shown in FIG. 22B. The center of rotation at this time is a point between a point in the three-dimensional space corresponding to the location of touch of the thumb finger (the front face touch location), and a point in the three-dimensional space corresponding to the location of touch of the index finger (the back face touch location). For that reason, there will be obtained a display change result as if the 3D object physically existed at the location which was pinched or clamped by the two fingers from the front face and the back face, and as if the user grabbed and rotated the 3D object with the two fingers. The direction of rotation to which the 3D object is rotated changes according to the direction to which the fingers are made to slide in the touch operations on the front face and the back face.

Here, as touch operations for display change operations to clamp and rotate the 3D object with the two fingers, there has been exemplified the touch operations in which the thumb finger on the front face and the index finger on the back face are caused to slide in mutually opposite directions with respect to each other, but the touch operations for such display change operations are not limited to this. For example, there may be employed touch operations in which one of the fingers is fixed while touching. In cases where such touch operations are carried out, the relation between a finger fixed while touching among the fingers on the front face and the back face, and the center of rotation of the 3D object is shown in FIG. 22C. When the index finger on the back face is fixed while touching, the center of rotation of the 3D object becomes the location of the touch by the index finger. On the other hand, when the thumb finger on the front face is fixed while touching, the center of rotation of the 3D object becomes the location of the touch by the thumb finger. By doing so, even in cases where a finger on the front face or on the back face is fixed while touching, it is possible for the user to input a display change operation instruction for grasping and rotating the target object by means of intuitive touch operations.

Now, a Z axis rotation operation of the 3D object will be explained by using FIG. 23A and FIG. 23B. FIG. 23A shows a display state before rotation, and FIG. 23B shows a display state after rotation. In the touch operations for the Z axis rotation, first, the thumb is fixed while touching on a target object in the front face, and the index finger is also fixed while touching on the target object in the back face. In this case, a straight line connecting between two points in the three-dimensional space corresponding to the locations of touches on the front face and the back face becomes an axis of rotation. This axis of rotation is illustrated as a Z axis of rotation 2301. If the locations of touches on the front face and the back face are the same (i.e., the positions of touches on the screen as a two-dimensional plane are the same), the axis of rotation will be parallel to the Z axis, whereas if the locations of touches on the front face and the back face are not the same, the axis of rotation will become a straight line inclined from the Z axis. Then, a slide operation is carried out in such a manner that the middle finger on the back face is rotated in a counterclockwise direction so as to draw a circle around the fixed touch locations. By this touch operation, a display change operation is carried out in such a manner that the square conical 3D object 1902 is rotated counterclockwise around the Z axis of rotation 2301 in accordance with the slide operation of the middle finger. If the direction of the rotation of the slide operation by the middle finger is clockwise, the direction of rotation in the display change operation of the 3D object will also become clockwise.

Figure 24B:
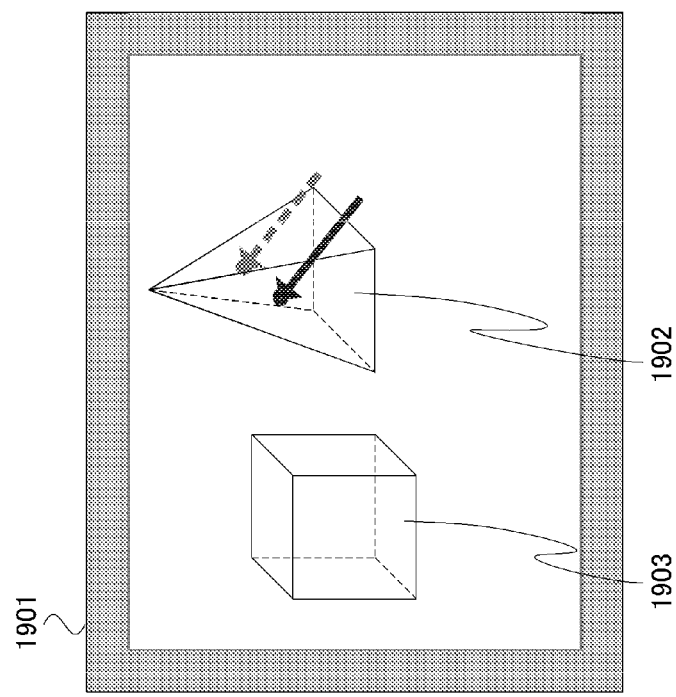
FIGS. 24A and 24B are conceptual diagrams showing a movement operation of the 3D object in an XY plane in the fifth embodiment.
Figure 24A:
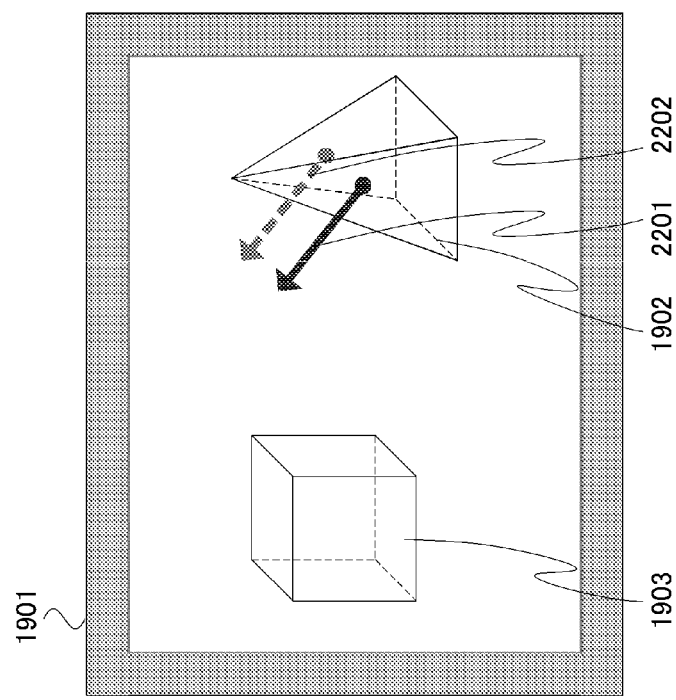

Hereinafter, a movement operation of the 3D object in parallel to the XY plane will be explained by using FIG. 24A and FIG. 24B. FIG. 24A shows a display state before movement, and FIG. 24B shows a display state after movement. In touch operations for the movement operation parallel to the XY plane, from the front face, after touching the position of the object in the form of a movement operation target with the thumb, the user carries out a slide operation in an direction shown by the front touch slide operation 2201. From the back face, after touching the position of the object in the form of the movement operation target with the index finger, a slide operation is carried out in an direction shown by the back touch slide operation 2202. By these touch operations, a movement in the X direction and a movement in the Y direction will take place at the same time, so that a translational movement of the square conical 3D object 1902 will be caused in an obliquely upper left direction, thus resulting in a display state as shown in FIG. 24B. According to these touch operations, the user can carry out the input of an instruction for the display change operation to cause the object to move in parallel to the XY plane, by means of intuitive touch operations, as if moving the object displayed on the screen by grasping it from the front face and the back face.

Hereinafter, a movement operation in the Z direction of the 3D object will be explained by using FIG. 25A and FIG. 25B. FIG. 25A shows a display state before movement, and FIG. 25B shows a display state after movement. Similar to the fourth embodiment, a movement in the Z axis direction corresponds to a display change operation for scale enlargement and/or scale reduction, and in this embodiment, special slide operations are assigned as touch operations for this display change operation. That is, in touch operations for movement in the Z axis direction, from the front face, after touching the position of the target object with the thumb, the user fixes the thumb while touching. In addition, from the back face, the user carries out slide operations at the same time by means of two fingers, i.e., the index finger and the middle finger, as shown in a back face touch slide operation 2501 of the two fingers. These touch operations simulate an operation for wheel rotation of a mouse. According to this, the square conical 3D object 1902 selected with the thumb will be moved to the near side, thus resulting in a display state in which the square conical 3D object 1902 is enlarged, as shown in FIG. 25B.

Here, note that the reason for carrying out the slide operation with the two fingers from the back face is that with a slide operation of one finger, it is undistinguishable from the touch operations for rotation explained using FIG. 22A through FIG. 22C. In contrast to this, by using the slide operation of the two fingers for the touch operations for Z axis movement (enlargement/reduction), the user can clearly distinguish the Z axis movement (enlargement/reduction) and rotation from each other, and can prevent confusion between operations.

According to the above touch operations, the user can carry out the input of an instruction for the display change operation with respect to the object, by means of intuitive touch operations, as if operating the object displayed on the screen by grasping it from the front face and the back face.

Next, reference will be made to display change operations with respect to the entire screen. A list of touch operations corresponding to display change operations is shown in tables of FIGS. 26A and 26B. The axes of coordinates and the directions of rotation are shown in FIG. 26C. By a display change operation with respect to the entire screen, display states are collectively changed with respect to the whole of 3D objects (the whole of internal data) which exist in an internal three-dimensional space in which the 3D objects are defined. For example, in FIG. 19, the displays of a 3D object display A1902 and a 3D object display B1903 are changed in a collective manner. A display change operation for the entire screen can also be said to be an operation to move the user's view point. Hereinafter, the display change operation with respect to the entire screen is also called a view point change operation.

When it is considered that a view point change operation is one in which a display change operation for each object explained using FIG. 21 through FIG. 25B is applied to the entire objects in the internal three-dimensional space, the same touch operations as those for the display change operation for each object can be applied to the view point change operation. Hereinafter, reference will be made to touch operations for a view point change operation by the use of the following figures, while focusing on differences thereof with a display change operation for each object.

In the touch operations for the view point change operation, the location of a touch is set to a location except for objects being displayed, for example, the location of the background, and after having once touched a location other than the objects, the user starts a slide operation. However, as to rotation and movement by a single-sided touch operation, they are not included in the display change operation for each object, and so, if the user starts a slide operation after touching an arbitrary location in the screen, there will be no confusion with the display change operation for each object.

Touch operations corresponding to screen rotation operations (sight line direction change operations) around the X axis, the Y axis and the Z axis are the same as the touch operations explained with respect to FIG. 22A through FIG. 22C, FIG. 23A, and FIG. 23B, but are different from the rotation operation for each object in that the target to be rotated becomes the entire screen.

Now, the screen rotation operations (i.e., operations to change the direction of sight line) will be explained, by the use of FIG. 27A and FIG. 27B. A direction of $\phi$ and a direction of $\theta$, which are the directions of rotation, are shown in FIG. 26C. The screen rotation operation (sight line direction change operation) is constructed as an operation of rotating, around the origin of the axes of coordinates, a virtual spherical surface with a radius which is a distance from the origin to a point which has first been touched by the user, and a slide operation is used as a touch operation for that purpose. FIG. 27A shows a display state before screen rotation, and FIG. 27B shows a display state after screen rotation. In touch operations for the screen rotation operation, for example, from the front face, after having touched the object with the thumb, the user carries out a slide operation, as shown by the front touch slide operation 2201. From the back face, no touch operation is made. By such touch operations, the entire screen is rotated in such a manner that the spherical surface is rotated about a fixed center of rotation 2701 which lies in the middle of the screen. At this time, a rotation in the θ direction and a rotation in the ϕ direction occur at the same time, and as a result, a rotation, which is synthesized by the above rotations, is carried out, thus resulting in the display state shown in FIG. 27B. By such touch operations, the user can carry out the input of an instruction for the display change operation (sight line direction change operation) to rotate the entire screen display about the middle of the screen, by means of intuitive touch operations, as if rotating the spherical surface.

Here, note that an example has been explained herein in which the rotation operation of the entire screen is carried out by means of a front touch slide operation, but the rotation operation of the entire screen may be carried out by means of a back touch slide operation. In either case, the rotation operation of the entire screen is single-sided touch operations, and the rotation operation for each object is double-sided touch operations, and hence, the user can start the touch operations for the rotation operation of the entire screen by touching an arbitrary point. That is, even if the user starts touch operations by touching on an object, it does not become touch operations for the rotation operation for each object.

Figure 28B:
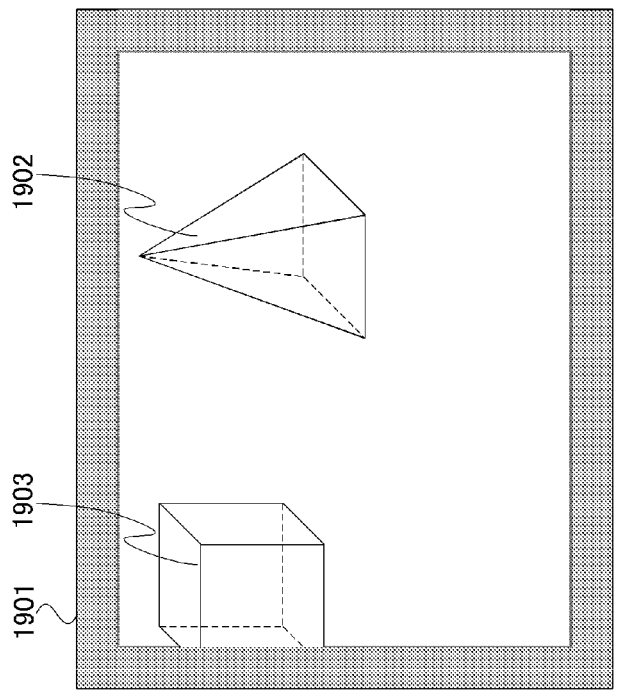
FIGS. 28A and 28B are conceptual diagrams showing a movement operation of the 3D object carried out by a one sided touch operation in the fifth embodiment.
Figure 28A:
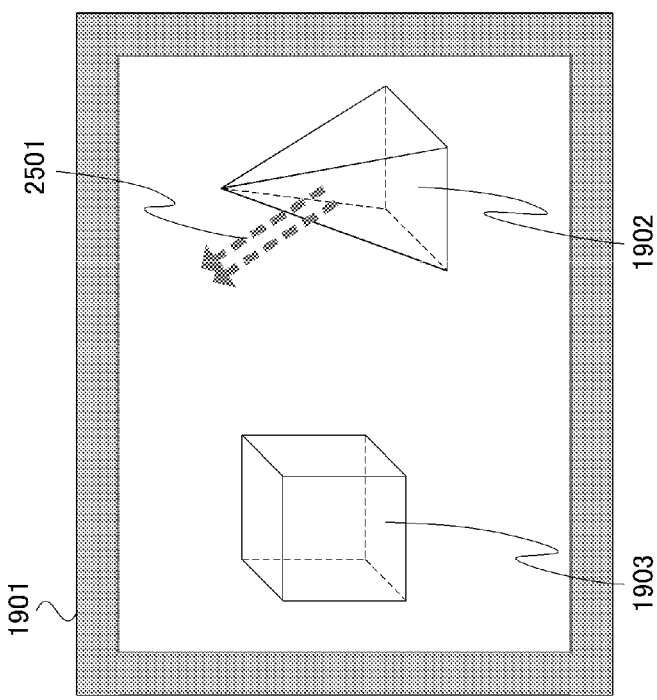

In this embodiment, as touch operations for movement operations of the entire screen (view point position movement operations) in the X direction and in the Y direction, there are assigned two kinds of cases; a first case in which the view point position movement operations are carried out by double-sided touch operations, and a second case in which the view point position movement operations are carried out by single-sided touch operations. In cases where the view point position movement operations are carried out by double-sided touch operations, touch operations therefor are the same as those explained using FIGS. 24A and 24B, but they are different in that a target to be moved becomes the entire screen. The movement operations of the entire screen carried out by single-sided touch operations will be explained, by the use of FIG. 28A and FIG. 28B. FIG. 28A and FIG. 28B show examples in which the entire screen is caused to move in an obliquely upper left direction. FIG. 28A shows a display state before movement, and FIG. 28B shows a display state after movement. In the single-sided touch operations for the movement operations of the entire screen (the view point position movement operations), from the back face, two fingers are made to slide in the obliquely upper left direction, as shown by the back face touch slide operation 2501 of the two fingers. From the front face, no touch operation is made. By such touch operations, a translational movement of the entire screen is caused in the obliquely upper left direction. At this time, a movement in the X direction and a movement in the Y direction occur at the same time, and as a result, a movement, which is synthesized by the above movements, is carried out, thus resulting in the display state shown in FIG. 28B.

In the double-sided touch operations, they become touch operations in which fingers on the opposite sides of the display screen are made to move, while grasping or clamping the display screen with the fingers, and so it is difficult to cause the fingers to slide a large moving distance extending over the whole area of the screen. In contrast, in the case of the single-sided touch operations, it is easy to carry out a slide operation over such a large moving distance. However, in a single-sided slide operation with one finger, there occurs confusion with the touch operations for the rotation operation about the middle of the screen as the center of rotation, as shown in FIG. 27A and FIG. 27B. In addition, touch operations for enlargement/reduction, which are movements in the Z direction, are operations to slide on the back face with two fingers. Accordingly, in the case of performing the movement operations of the entire screen (the view point position movement operations) by means of single-sided touch operations, by performing slide operations on the back face with two fingers, a touch operation system is constructed such that the movement operations can be reminded or suggested from the slide operations with the two fingers. As a result of this, it becomes easy for the user to understand the operation system, thereby making it possible to improve operability.

The touch operations for enlargement/reduction of the entire screen (Z axis direction movement of the view point position) are the same as the touch operations for enlargement/reduction explained using FIG. 12A and FIG. 12B in the fourth embodiment, and the explanation thereof is omitted.

Here, reference will be made to a flow and a display action of the instruction input processing of display change operations by the above-mentioned touch operations. The flow chart representing the processing of this embodiment is substantially the same as the flow chart of FIG. 18 explained in the fourth embodiment. Here, the difference of this embodiment from the contents explained in the fourth embodiment will be mainly explained.

First, in step S1801, the CPU 106 acquires, as user interface information, information on the correlation relation between the display change operations and touch operations shown in FIG. 21, FIG. 22C, FIGS. 26A and 26B. Hereafter, until step S1811, the same processing as in the fourth embodiment is carried out. In step S1811, the CPU 106 determines whether it is a display change operation for each object, or a display change operation of the entire screen (viewpoint position change operation). This determination is carried out by determining whether the location of a touch is on an object or a location other than that (background, etc.). Subsequently, in step S1812, the CPU 106 selects user interface information according to a result of the determination made in step S1811. Specifically, the CPU 106 selects the operation system of FIG. 21, when the double-sided touch operations are started on the object, but selects the operation system of FIGS. 26A and 26B, when otherwise.

The processing thereafter is the same as what has been described in the fourth embodiment.

According to this embodiment, it becomes possible for the user to input an instruction of complicated display change operations of changing the display state of a 3D object in the three-dimensional space to the display device, by an intuitive and simple operation system which is a combination of front face touch operations and back face touch operations.

Here, note that in FIG. 19, an example is shown in which an object, which is a target for display change operations, is displayed within a range in which fingers of a user's hand holding the display device can reach, but in cases where the display device has a larger screen, the range in which the fingers of the hand holding the display device can reach is limited. Accordingly, a method to improve this will be explained below while using FIG. 29. In a display example in FIG. 29, a screen is constructed such that child or sub screens for touch operations are formed in ranges in which fingers of user's hands holding a display device can reach.

Figure 29:
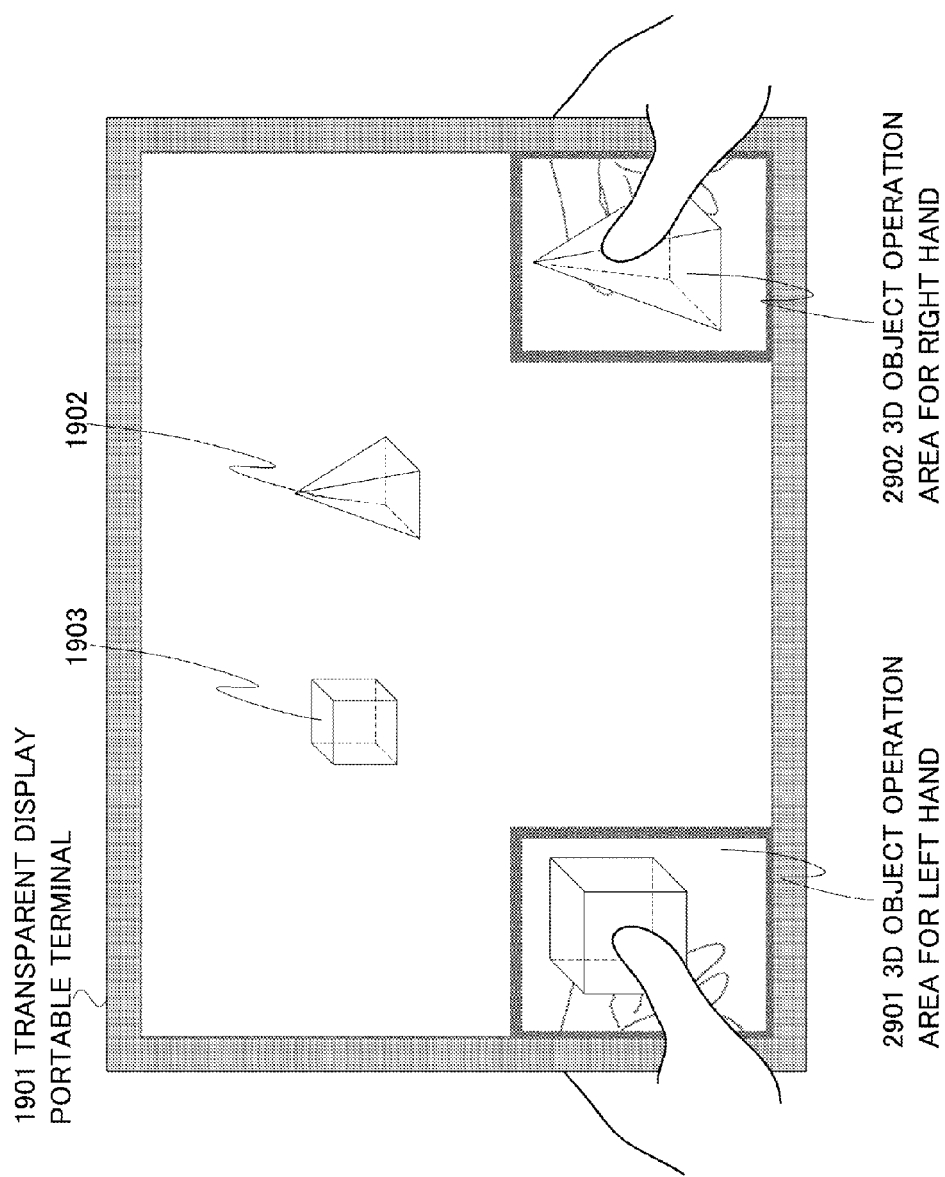
FIG. 29 is a conceptual diagram showing child screens for touch operation in the case of a large screen in the fifth embodiment.

In FIG. 29, a 3D object operation area 2901 for left hand and a 3D object operation area 2902 for right hand are displayed as child screens for touch operation. By performing touch operations on objects on the child screens, respectively, the user can carry out display change operations on the objects 1902, 1903, respectively, displayed on a main screen. Here, note that even if the user carries out touch operations in the display positions of the objects 1902, 1903 in the main screen, the user can carry out display change operations on the objects 1902, 1903, respectively, as in the case of performing touch operations on objects in the child screens, respectively. In addition, the selection of an object to be displayed on a child screen is made, for example, by touching the object displayed on the main screen.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-150514, filed on Jul. 4, 2012, and Japanese Patent Application No. 2013-090165, filed on Apr. 23, 2013, which are hereby incorporated by reference herein in their entirety.

What is claimed is:

1. A display device wherein a touch operation can be carried out from both sides thereof including a front face and a back face, the display device comprising:
   a detection unit configured to detect a touch operation on the front face and a touch operation on the back face; and
   a control unit configured to perform display control of graphics data for touch operation,
   wherein the control unit performs display control to enlarge or reduce an object displayed on a screen when the touch operation on the front face and the touch operation on the back face are carried out in the same region and the touch operation on one of the front face and the back face is a sliding touch operation with multiple fingers, and
   wherein the control unit performs display control to cause the object displayed on the screen to rotate around a virtual axis of rotation parallel to the screen when a sliding touch operation with a finger on the front face and a sliding touch operation with a finger on the back face have been carried out in directions opposite to each other in the same region.

2. The display device as set forth in claim 1, wherein, when a sliding touch operation with a finger on the front face and a sliding touch operation with a finger on the back face have been carried out in directions opposite to each other but not in the same region, the control unit performs display control to cause the object displayed on the screen to rotate in a plane parallel to the screen.

3. The display device as set forth in claim 1, wherein when a sliding touch operation on either the front face or the back face has been carried out, the control unit performs display control to cause the object displayed on the screen to move in a plane parallel to the screen.

4. The display device as set forth in claim 1, wherein the control unit performs display control to enlarge or reduce an object displayed on a screen when the touch operation on the front face and the touch operation on the back face are carried out in the same region and the touch operation on one of the front face and the back face is a sliding touch operation with multiple fingers and the touch operation on the other of the front face and the back face is a touch operation in which one finger stays in one location.

5. A display device in which a touch operation can be carried out from both sides thereof including a front face and a back face, the display device comprising:
   a detection unit configured to detect a touch operation on the front face and a touch operation on the back face; and
   a control unit configured to perform display control of graphics data for touch operation,
   wherein the control unit performs display control to enlarge or reduce an object displayed on a screen when the touch operations on the front face and the back face are carried out in the same region and the touch operation on one face is a sliding touch operation with multiple fingers,
   wherein the control unit is adapted to cause the object displayed on the screen to rotate around the virtual axis of rotation according to a first rotational speed or a second rotational speed different from the first rotational speed,
   wherein the first rotational speed is a rotational speed when a sliding touch operation with a finger on the front face and a sliding touch operation with a finger on the back face have been carried out at the same time in directions opposite to each other, and
   wherein the second rotational speed is a rotational speed when a sliding touch operation with a finger has been carried out on one of the front face and the back face and a touch operation in which a finger is fixed while touching has been carried out on the other face.

6. The display device as set forth in claim 5, wherein the control unit performs display control to enlarge or reduce an object displayed on a screen when the touch operation on the front face and the touch operation on the back face are carried out in the same region and the touch operation on one of the front face and the back face is a sliding touch operation with multiple fingers and the touch operation on the other of the front face and the back face is a touch operation in which one finger stays in one location.

7. A control method for a display device wherein a touch operation can be carried out from both sides thereof including a front face and a back face, the control method comprising:
   a detection step of detecting a touch operation on the front face and a touch operation on the back face; and
   a control step of performing display control of graphics data for touch operation,
   wherein, in the control step, when the touch operation on the front face and the touch operation on the back face are carried out in the same region and the touch operation on one of the front face and the back face is a sliding touch operation with multiple fingers, display control is performed to enlarge or reduce an object displayed on a screen, and wherein, in the control step, when a sliding touch operation with a finger on the front face and a sliding touch operation with a finger on the back face have been carried out in directions opposite to each other in the same region, display control is performed to cause the object displayed on the screen to rotate around a virtual axis of rotation parallel to the screen.

8. The control method for a display device as set forth in claim 7, wherein in the control step, when a sliding touch operation with a finger on the front face and a sliding touch operation with a finger on the back face have been carried out in directions opposite to each other but not in the same region, display control is performed to cause the object displayed on the screen to rotate in a plane parallel to the screen.

9. The control method for a display device as set forth in claim 7, wherein, in the control step, when a sliding touch operation on either the front face or the back face has been carried out, display control is performed to cause the object displayed on the screen to move in a plane parallel to the screen.

10. The control method for a display device as set forth in claim 7, wherein, in the control step, when the touch operation on the front face and the touch operation on the back face are carried out in the same region and the touch operation on one of the front face and the back face is a sliding touch operation with multiple fingers and the touch operation on the other of the front face and the back face is a touch operation in which one finger stays in one location, display control is performed to enlarge or reduce an object displayed on a screen.

11. A control method for a display device in which a touch operation can be carried out from both sides thereof including a front face and a back face, the control method comprising:

a detection step of detecting a touch operation on the front face and a touch operation on the back face; and a control step of performing display control of graphics data for touch operation, wherein, in the control step, when the touch operations on the front face and the back face are carried out in the same region and the touch operation on one face is a sliding touch operation with multiple fingers, display control is performed to enlarge or reduce an object displayed on a screen, wherein, in the control step, the object displayed on the screen is rotated around the virtual axis of rotation according to a first rotational speed or a second rotational speed different from the first rotational speed, wherein the first rotational speed is a rotational speed when a sliding touch operation with a finger on the front face and a sliding touch operation with a finger on the back face have been carried out at the same time in directions opposite to each other, and wherein the second rotational speed is a rotational speed when a sliding touch operation has been carried out on one of the front face and the back face and a touch operation with a finger in which a finger is fixed while touching has been carried out on the other of the front face and the back face.

12. The control method for a display device as set forth in claim 11, wherein, in the control step, when the touch operation on the front face and the touch operation on the back face are carried out in the same region and the touch operation on one of the front face and the back face is a sliding touch operation with multiple fingers and the touch operation on the other of the front face and the back face is a touch operation in which one finger stays in one location, display control is performed to enlarge or reduce an object displayed on a screen.

* * * * *